(12) United States Patent
Hislop et al.

(10) Patent No.: US 8,359,744 B2
(45) Date of Patent: Jan. 29, 2013

(54) HEAT EXCHANGER

(75) Inventors: Drummond Watson Hislop, London (GB); Stephen David Joseph, New South Wales (AU)

(73) Assignee: Sustainable Engine Sytems Ltd., London (GB)

( * ) Notice: Subject to any disclaimer, the term of this patent is extended or adjusted under 35 U.S.C. 154(b) by 1366 days.

(21) Appl. No.: 11/793,000

(22) PCT Filed: Dec. 13, 2005

(86) PCT No.: PCT/GB2005/004781
§ 371 (c)(1),
(2), (4) Date: Sep. 26, 2007

(87) PCT Pub. No.: WO2006/064202
PCT Pub. Date: Jun. 22, 2006

(65) Prior Publication Data
US 2008/0210413 A1 Sep. 4, 2008

(30) Foreign Application Priority Data
Dec. 14, 2004 (GB) .................................. 0427362.9

(51) Int. Cl.
*B21D 53/02* (2006.01)
*B22F 3/00* (2006.01)
*B23P 15/26* (2006.01)

(52) U.S. Cl. ...................... 29/890.03; 29/890.054; 419/5

(58) Field of Classification Search ............... 29/898.03, 29/890.054, 890.03; 165/140, 154, 157, 165/172, 173, 133, 134.1, 135, 136; 419/5
See application file for complete search history.

(56) References Cited

U.S. PATENT DOCUMENTS
(Continued)

FOREIGN PATENT DOCUMENTS
EP 0 289 116 11/1988
EP 0 637 727 2/1995
(Continued)

OTHER PUBLICATIONS
Machined Translation of JP 2003-129862 A (submitted as part of Applicant's IDS filed on Sep. 22, 2010).*
(Continued)

*Primary Examiner* — Sarang Afzali
(74) *Attorney, Agent, or Firm* — Nixon & Vanderhye P.C.

(57) ABSTRACT

A heat exchanger may be manufactured using a number of different methods, each having their own benefits and deficiencies. A method of making a monolithic heat exchanger having a plurality of conduits passing through it is provided and comprises the steps of: providing a plurality of successive layers of a material to be remelted and energy beam remelting predetermined regions of each layer in accordance with a predetermined design. The energy beam remelting of each layer is performed prior to the addition of a successive layer. The regions of each layer which are subjected to energy beam remelting form solid structures within the layer, and the energy beam remelting of each layer fuses the remelted regions of each layer to the remelted regions of the preceding layer. This results in the manufacture of a three-dimensional monolithic unit. The heat exchanger is manufactured to have a surface area density of at least 5000 $m^2/m^3$ and a mean average porosity of at least 0.6. The energy beam could, for example, be a laser beam or an electron beam.

48 Claims, 16 Drawing Sheets

U.S. PATENT DOCUMENTS

Figure 1A:
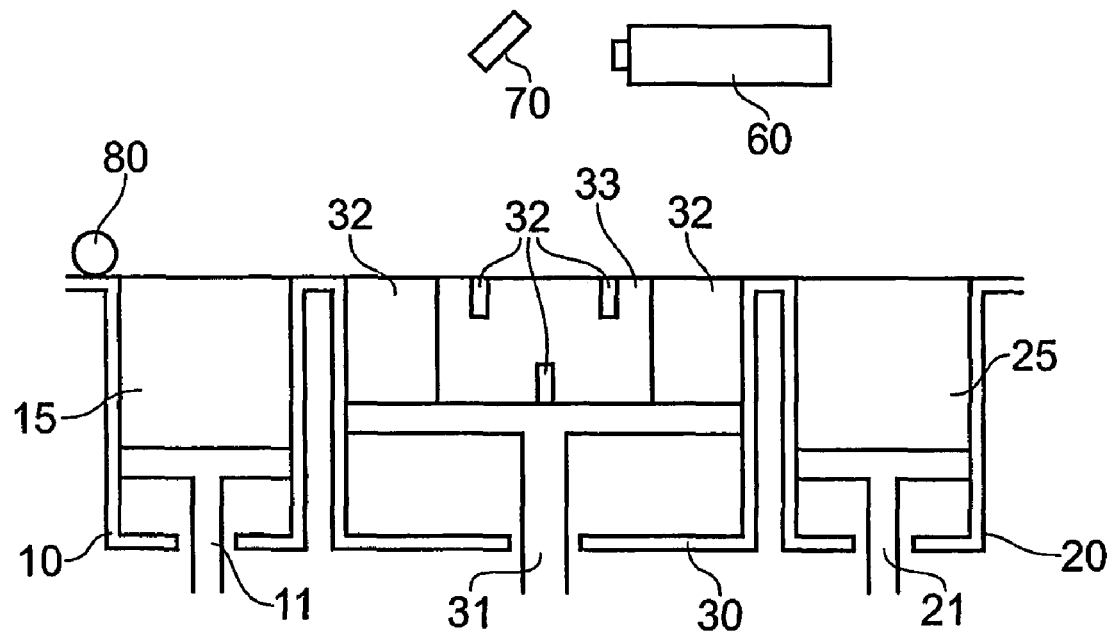

| | | | | |
|---|---|---|---|---|
| 4,818,562 | A | * | 4/1989 | Arcella et al. ............... 427/597 |
| 5,205,276 | A | * | 4/1993 | Aronov et al. ............... 126/109 |
| 6,397,940 | B1 | * | 6/2002 | Blomgren ..................... 165/167 |
| 6,695,044 | B1 | * | 2/2004 | Symonds ...................... 165/166 |
| 6,811,744 | B2 | * | 11/2004 | Keicher et al. ................... 419/5 |
| 6,865,825 | B2 | * | 3/2005 | Bailey et al. ...................... 36/88 |
| 7,115,336 | B2 | * | 10/2006 | Revol ............................ 429/434 |
| 2004/0217095 | A1 | * | 11/2004 | Herzog ................... 219/121.85 |

FOREIGN PATENT DOCUMENTS

| | | |
|---|---|---|
| GB | 1069477 | 5/1967 |
| GB | 1100445 | 1/1968 |
| JP | 63-230264 | 9/1988 |
| JP | 7-151478 | 6/1995 |
| JP | 8-219679 | 8/1996 |
| JP | 9-189490 | 7/1997 |
| JP | 2003-129862 | 5/2003 |
| WO | 03/071626 | 8/2003 |
| WO | 2004/014637 | 2/2004 |

OTHER PUBLICATIONS

Notice of Reasons for Rejection mailed Aug. 17, 2010 in corresponding JP 2007-544994 & English translation.

W.M. Kays et al, "Compact Heat Exchangers" 1998, Preface, pp. 1-10, 122-123, 148-149, Figs. 10-98 & 10-99.

L. Lu et al, "Laser-induced Materials and Processes for Rapid Prototyping" 2001, Preface, pp. 1-6, 91-92, 104-105, 143-148, 155 & 261.

International Search Report for PCT/GB2005/004781 mailed Apr. 21, 2006.

UK Search Report for GB 0427362.9, date of search Mar. 14, 2005.

Written Opinion for PCT/GB2005/004781 mailed Apr. 21, 2006.

L. R. Arana et al, "Microfabricated Suspended-Tube Chemical Reactor for Thermally Efficient Fuel Processing" *Journal of Microelectromechanical Systems*, vol. 12, No. 5, Oct. 2003, pp. 600-612.

N. Delalic et al, "Porous media compact heat exchanger unit—experiment and analysis" *Experimental Thermal and Fluid Science*, 28, 2004, pp. 185-192.

R. H. Morgan et al, "High density net shape components by direct laser re-melting of single-phase powders" *Journal of Materials Science*, 37, 2002, pp. 3093-3100.

D. T. Queheillalt et al, "Electron-Beam Directed Vapor Deposition of Multifunctional Structures for Electrochemical Storage" *Proceedings of SPIE*, vol. 4698, 2002, pp. 201-211.

W. Meiners et al, Direct Generation of Metal Parts and Tools by Selective Laser Power Remelting (SLPR), pp. 655-661, Nov. 1998.

* cited by examiner

HEAT EXCHANGER

This application is the U.S. national phase of international application PCT/GB2005/004781 filed 13 Dec. 2005, which designated the U.S. and claims benefit of GB 0427362.9 filed 14 Dec. 2004, the entire contents of each of which are hereby incorporated by reference.

The present invention relates to a heat exchanger and a method of producing a heat exchanger. Preferred embodiments of the invention relate to a heat exchanger and method of producing a heat exchanger which is suitable for use with a Stirling engine.

A Stirling engine's heater (the heat exchanger through which a hot fluid, typically hot gases from the combustion of a fuel, but also waste heat, heat from solar energy and other sources, transfers some of its heat to the pressurized charge gas inside the engine) may be assembled from a typically cylindrical array of U-shaped tubes, with the combustion gases typically passing downwards and radially outwards from above the centre of the array or radially outward from within it, first between the inner arms of the U-shaped tubes, and then between their outer arms. The tubes may, for instance, be made of stainless steel or heat resistant alloys. Also, the combustor is usually physically separated from the heat exchanger, and relatively large combustion chambers are needed to contain a long flame length, to promote complete mixing and to generate turbulence. Heat transfer between the combustion gases and the tube walls is mainly convective.

Specifying and designing the structure of a Stirling heater raises a number of problems due in part to the need to balance considerations such as the desirability of high rates of heat transfer between combustion gases and charge gases via the tube walls of the heater, low pressure drops through the tubes, low internal volume of the tubes, low cost, and thermal robustness. To improve the Stirling engine's power output and reducing overall size, weight and cost, there is a need to reduce the internal volume (charge gas side) of the heat exchanger while increasing the external heat transfer area (combustion gas side). This requires that the heater consist of large numbers of fine bore tubes, rather than smaller numbers of wider bore tubes. In order to maintain acceptable gas speeds and to maintain pressure drops at acceptable levels, short, fine bore tubes are preferred rather than long ones. Also, the fluid supplying the heat is a gas which is typically at a lower pressure than the pressure of the charge gas inside the engine. Due to this, and in order to obtain a high rate of heat transfer between the fluid supplying the heat and the charge gases within an acceptable length of tube, it is desirable to provide a high ratio between the external and internal heat transfer surface areas of the tubes. Such high ratios can be achieved by increasing the wall thickness of the tube beyond what is needed to contain the pressure of the charge gas, but this increases weight and cost, leads to higher stresses, and reduces the rate of heat transfer through the wall of the tube itself. One solution is for all or part of the U-tube—in the example described above it will usually be the outer, downstream arm that receives the fluid that has already lost some of its heat to the inner, upstream arm—to be finned, to increase its heat transfer area and maximize heat transfer to the walls of the tubes. However, these fins increase weight and costs, can be difficult to fabricate, and can be thermally vulnerable.

In practice, the expense and the technical difficulties involved in the assembly of heat exchangers or heaters having large numbers of short, fine bore tubes induce a compromise in which they will consist of a smaller number of larger, longer tubes than is desirable. Typical engines for commercial applications may use 20 to 200 tubes of 3 mm to 10 mm bore, which may be 200 to 500 mm long. Such heaters have relatively low surface area densities of, typically, less than 200 $m^2/m^3$, with surface porosities of less than 0.4.

Surface area density is a measure of the wetted heat transfer surface area per unit box volume of the heat exchanger. Porosity is a measure of the proportion of the total surface volume of the heat exchanger accounted for by the wetted fluid passage volumes within that total volume. The heat exchanger format described above for Stirling engines has the following disadvantages:

(i) Thermal vulnerability;
(ii) High dead space, which reduces the power output and/or efficiency of the Stirling engine;
(iii) High costs of high temperature materials, and of manufacture and assembly, particularly of finned tubes;
(iv) Uneven heating of the tubes, leading to reduced life and heat transfer efficiency;
(v) The danger of stresses and leaks in the joins between the heat exchanger and the combustor;
(vi) Too large and heavy;
(vii) Tubes that are too few, too long and too wide.

There are many other different types of known heat exchanger but none matches the dimensional and performance requirements of heaters for Stirling engines. In recent years, the development of "compact" heat exchangers, with smaller fluid ducts and higher heat transfer surface densities of over 300 $m^2/m^3$, with porosities that can reach over 0.8, demonstrate the potential for meeting the initial dimensional requirement: large numbers of short ducts with smaller hydraulic diameters. However, none of the known types of compact heat exchanger is capable of meeting the combined high pressure and temperature performance requirements.

One method of manufacturing a heat exchanger that comes closest to the performance requirements as well as to the dimensional requirements is the diffusion bonded heat exchanger. This involves the assembly of a number of plates, one or both faces of which have been machined or etched with channels or grooves (see U.S. Pat. No. 6,695,044 and PCT/GB90/00675). When the plates are stacked together, these grooves are closed and thereby form passages through which fluids may flow, react and/or transfer heat. Such grooves may zig-zag or otherwise curve within the plane of the plate to provide turbulent flow and enhance heat transfer. It is also possible to provide apertures in one or more of the grooves or groove walls, to allow fluid to pass from a groove to an adjacent groove in the same plate, or to an adjacent groove in another plate. If required, catalysts may be included in the system, either as the material of a duct wall, or placed/coated in or on a duct. Such heat exchangers may allow several fluids to exchange heat and/or react.

The main advantage of these exchangers is that they can allow reduction of the the ducts hydraulic diameter to 1 mm or less, and they can achieve surface area densities of up to or exceeding 5,000 $m^2/m^3$, allowing large reductions in overall size and weight compared with, for example, shell and tube heat exchangers with equivalent heat transfer loads. When made of suitable materials, they can operate at very high pressures of over 400 bar, or at high temperatures of up to 900° C.

However, compact heat exchangers manufactured in this manner also have disadvantages.

1. The manufacture of each plate, which involves precision machining, photochemical etching and/or other similar processes, and the diffusion bonding process itself, are expensive.
2. The use of plates limits the ability to design the heat exchanger in three dimensions.

3. The use of grooves has implications for performance and for porosity and surface area density. The longitudinal join, formed by the meeting of the longitudinal edge of the groove with the plane of the adjacent plate that closes the groove, forms two unavoidable longitudinal stress concentrators. The cross section of grooves made by photo-chemical etching and similar processes typically takes the form of a semi-circle or the chord of a circle; but where the groove cross-section takes the form of a square or a rectangle or similar form with corners or other relatively abrupt changes in the direction of the perimeter of the groove at the closed end of the groove, as may be the case if the grooves are machined or laser etched, these corners may also form additional stress concentrators. This means that although the bond strength of a diffusion bonded structure may achieve that of the parent metal, the heat exchanger cannot be operated at the combined high temperatures and pressures required in the Stirling heater.
4. The very high pressures used to bond the plates can lead to distortion of the land between each pair of adjacent grooves in the same plate, and allowance must be made by providing a wider land than would otherwise be required.
5. In many applications for such heat exchangers, the material must be stainless steel or similar high temperature and/or high strength materials, whose relatively low heat transfer coefficients may require thicker fins, which, in the diffusion bonded heat exchanger are the lands between adjacent grooves, and the amount of plate thickness needed at the closed end of the groove.
6. The consequence of the last two disadvantages is that the porosity for such heat exchangers is relatively low—at about 0.5-0.6, compared with 0.6-0.7 for compact brazed stainless steel plate-fin heat exchangers, and over 0.8 for high performance compact aluminum or copper plate fin heat exchangers.
7. The block shape of a diffusion bonded exchanger is necessarily constrained to be rectangular, or nearly so, in section, because of the pressure requirements of the bonding process. This puts considerable limitations on the shape and hence potential applications of such block, unless expensive machining of redundant material is employed.
8. Diffusion bonding methods of manufacturing compact heat exchangers do not allow readily allow finning or other means of surface enhancement.

The present invention seeks to provide compact heat exchangers that overcome these problems of compact diffusion bonded heat exchangers and which also improve other types of compact heat exchanger such as the welded or brazed plate-fin compact heat exchanger.

One aspect of the invention provides a method of making at least a portion of a heat exchanger, said portion having a plurality of conduits passing therethrough, the method comprising the steps of:

providing a plurality of successive layers of a material to be remelted;

energy beam remelting predetermined regions of each layer in accordance with a predetermined design, the laser remelting of each layer being performed prior to the addition of a successive layer;

wherein the regions of each layer subjected to energy beam laser remelting form solid structures within the layer, and wherein the energy beam laser remelting of each layer fuses the remelted regions of each layer to the remelted regions of the preceding layer;

and wherein said plurality of conduits have substantially continuously curved outer cross-sections.

A heat exchanger formed by energy beam remelting (such as, for example, selective laser remelting SLR) and having conduits with substantially continuously curved cross-sections (ignoring interruptions such as reentrant protrusions, internal fins and spacers/supports for further conduits, junctions with other conduits etc.) allows the above described problems to be addressed, and in particular allows compact heat exchangers capable of simultaneously high temperature and pressure operation, with increased surface area density and porosity to be achieved. The none re entrant outer cross-section being continuously curved reduces the problems associated with stress concentrations in other systems. The energy beam remelting could use laser beams, electron beams or some other form of energy beam. Conventional sintering uses high temperatures and pressures to fuse particles together, by friction and/or heat. "Energy beam" sintering fuses particles together in layers with precisely targeted temperatures which at least partially melts the material (possibly fully melts) so that it fuses into the remelted previous layer and this process is a form of energy beam remelting encompassed within the present techniques. Energy beam remelting can use one or more beams of various forms to provide various degrees of remelting to fuse together layers of material (powder).

The present techniques have both general and specific advantages depending upon the particular embodiments. Not at all of the advantages apply to every embodiment. Of the general advantages, first, it is suitable for lower cost production as it can be continuous and software driven; second, it allows the ability to build the structure in 3D—this provides a design freedom previously not available. Its specific advantages will vary according to the conventional heat exchanger that it displaces.

If made in the form of the diffusion bonded plate type heat exchanger, it has the following specific advantages over that type of heat exchanger.

1. With no distortion from the very high pressures used in diffusion bonding, the lands between adjacent ducts may be thinner, so less material is used, and, for a given duct hydraulic radius, both the surface area density and the porosity are increased.
2. Energy beam remelting allows conduits with substantially continuously curved outer cross-sections (allowing for interruptions such as internal fins and spacers/supports for internal further conduits). This reduces or even eliminates the problems of stress concentrators. In turn, this allows the use of higher temperatures and/or pressures than would otherwise be possible; alternatively or as well it allows thinner lands and/or plates, with the advantages described in 1 above. The conduit cross-sections can have a variety of shapes, and multiple shapes within a single heat exchanger, but they are preferably circular or elliptical.
3. By allowing any shape or configuration of duct for a given hydraulic diameter, energy beam remelting allows more ducts in a given plane dimension and with a given land thickness, with the advantages described in 1 above.
4. By eliminating the need for high pressure in the process, energy beam remelting allows the manufacture of the heat exchanger with any elevation cross-section.

The energy beam remelting process can also be used to manufacture heat exchangers of the conventional plate-fin type, whether vacuum brazed, welded or constructed by other means. In this case, the advantages are as follows:

1. Where two thicknesses of material were used to make a join—eg where two plates are welded together, face to face—energy beam remelting will use only one thickness of material. This saves weight and costs, and allows a small increase in surface area density and porosity for a given duct hydraulic diameter.
2. Where, typically, the secondary surfaces or fin structures are continuous, energy beam remelting makes it possible instead to use pin fins, whether of circular or other cross section, such as elliptical, and with cross section geometry and or area varying along the length of the pin, to increase the surface area density and porosity, without affecting the structural integrity. Pin fins provide a larger surface area density, and allow control of the boundary layers and of the turbulence between the pins, thereby allowing performance enhancement.

The energy beam remelting process can also be used to form heat exchangers whose design is not constrained by the block form of the diffusion bonded heat exchanger and which can consist of very large numbers of fine bore ducts are in the form of tubes, preferably of elliptical or circular cross section. In this case the advantages are:

1. The use of tubes allows the heat exchanger to operate at high pressures and temperatures such as those experienced by the Stirling engine heater.
2. The process allows the use of variations in format, such as the use of concentric tubes, that provide further increases in surface area density and porosity for given hydraulic radii, leading to further reductions in volume, weight and costs, compared with existing compact heat exchangers.

One or more portions of the heat exchanger may be manufactured by energy beam remelting and some by other means. For example, some or all conduits may be manufactured by conventional processes such as rolling and welding, or seamless extrusion. Some conduits may be inserted into predetermined positions in other components of an energy beam remelted heat exchanger, and may be fixed in place and/or attached to the energy beam remelted heat exchanger by a number of different means: for example, interference fit or shrink fit; they may be welded or brazed in place along all or part of their length by a variety of means. Such conduits may also be fixed in place by further energy beam remelting components to the external wall of the conduit. Energy beam melted manifolds may be constructed, typically using the end of the conduits as the base for starting the process. Alternatively, the manifolds or fins on the external surfaces of the conduits, might be the only components of the heat exchanger made using laser remelting.

The present techniques allow, in at least some preferred embodiments, the heat exchangers to achieve surface area densities of greater than 5000 $m^2/m^3$ and porosities of greater than 0.6 or in another preferred embodiment, a surface area density of 8000 $m^2/m^3$ and a mean average porosity of at least 0.7. Monolithic heat exchangers having these surface area density and mean average porosity characteristics have not previously been realised by existing selective energy beam remelting processes. Current designs used for the construction of heat exchangers by energy beam remelting are based on existing heat exchanger designs used with other manufacturing techniques such as diffusion bonded plates. They maintain the block form of the diffusion bonded heat exchanger, and use rectangular ducts. They cannot therefore operate at the combined temperatures and pressures possible with the present techniques, and have lower surface area density and mean average porosities. The present invention recognises that heat exchangers manufactured using energy beam remelting need not be limited by the same constraints that apply with other manufacturing methods. The method may also be used to form a monolithic heat exchanger having a surface area density of at least 5000 $m^2/m^3$ and a mean average porosity of at least 0.6.

The conduit cross-sections can have a variety of shapes, and multiple shapes within a single heat exchanger, but are preferably circular or elliptical (at least in their non-reentrant profile).

Although it will be appreciated that the material to be remelted may be in the form or a gel, liquid, or a sheet of material, the material to be remelted is preferably provided in a powder form. Powder is particularly straightforward to cleanse from the remelted heat exchanger, for instance by application of pressurized air or water through the heat exchanger, after the energy beam remelting process has been completed.

In order to reduce stresses in the remelted structure, each layer of powder may be heated to near its remelting point before energy beam remelting of that layer commences. This results in a lower temperature gradient within the layer, reducing the instances of cracking of the remelted structure when it cools.

Fine control over mixing of fluids within the heat exchanger is possible by varying the porosity of the heat exchanger within a layer and/or between layers. Typically, the walls of conduits within a heat exchanger will have a porosity of substantially zero, that is they will be impermeable to the passage of any fluid which the heat exchanger is designed to contain. However, under certain circumstances it is desirable for the walls between conduits, or part thereof, to be permeable, to allow fluid to flow into or out of a conduit from or to an adjacent conduit to promote mixing or reaction of fluids from separate conduits.

Fine control over the structure and thermal characteristics of the heat exchanger may be obtained by providing that a group of one or more successive layers of powder comprises different materials than another group of one or more successive layers of powder. Accordingly, materials with specific characteristics, most particularly coefficients of thermal expansion and conduction, can be chosen to suit the temperature and pressure differences with which they have to cope, and to maximize heat transfer while minimizing stress and distortion, because these parameters change as a function of position within the heat exchanger. This may, for instance, make it possible to build certain regions of the heat exchanger, which may be subject to greater temperatures and pressures from a more expensive, but more robust material, while making the remainder of the heat exchanger from a cheaper but less robust material, or alternatively from a lighter material.

The energy beam remelting method enables improvements to be made to the format of existing compact heat exchanger designs. Conduits can be provided with a substantially complete curved cross section in which there is no abrupt interruption or change of direction in the curve (at least when considering the non-re entrant profile). Preferably the substantially curved cross section will be a substantially circular or elliptical cross section. Such an arrangement cannot easily be provided for in a diffusion bonded plate heat exchanger due to the two dimensional nature of the plates which lends itself more readily to segment-shaped ducts, in which the curve is interrupted at the junction of the plates in which it is formed and the adjacent plate that closes the curve, or to square or rectangular ducts.

Providing conduits having a preferably circular cross section helps to reduce pressure drops within the conduit. In turn, this allows walls between two adjacent conduits to have a thickness that need be no more than that of the wall needed for a free tube of the same hydraulic diameter as that of the duct. This will be less than, and in many cases much less than, the minimum distances needed between two segment-shaped, square or rectangular ducts of the same cross-sectional area. This applies both to adjacent ducts that in the diffusion bonded version would have been in separate adjacent plates, or between any two grooves that in the diffusion bonded version would have been adjacent grooves in the same plate. This enables a higher porosity and surface area density for a given hydraulic radius, leading to reductions in size, weight and cost of the heat exchanger.

The energy beam remelting method also enables improved freedom in orientation of the conduits within the heat exchanger. It is possible to provide horizontal, vertical or diagonal conduits, or any combination of the three. For example, a first subset of the conduits may have a first orientation and a second subset of the conduits may have a second orientation, the second orientation being different from the first orientation. Further, a third subset of the conduits may have a third orientation, the third orientation being different from both the first or second orientations.

The conduits may be straight or curved, of constant cross section or tapered. The curved conduits may be arranged to weave around other curved or straight conduits, reducing the spaces between adjacent conduits and increasing heat transfer rates and the porosity of the heat exchanger.

Regions of the heat exchanger separating two or more adjacent conduits may comprise a thermal insulator deposited by energy beam remelting or by any other suitable process. The thermal insulator serves to control heat transfer between different regions within the heat exchanger.

The energy beam remelting process also allows conduits to be formed within other conduits. Accordingly, one or more of the conduits may be an outer conduit and have an inner conduit disposed within it along at least a portion of its length. The outer conduit and the inner conduit may be arranged to receive either the same or different fluids, and the direction of flow of the fluids within the inner and outer conduits may either be in the same or different directions. The inner conduit may terminate within the outer conduit or may extend the whole length of the outer conduit. If the inner conduit terminates within the outer conduit, it may be terminated with a closed end, or may be left open to allow fluid to exit the inner conduit and to mix with the fluid within the outer conduit. Other structures may also be provided to terminate the inner conduit, such as a jet, nozzle, venture or the like.

The wall of the inner conduit may include one or more apertures or may be porous to allow mixing between the fluid in the outer conduit and the fluid in the inner conduit. Such apertures may be designed and located to provide appropriate control of the degree of mixing. The inner conduit and the outer conduit may have a substantially common longitudinal axis, or alternatively the inner conduit may have a longitudinal axis which is offset from the longitudinal axis of the outer conduit. It is also possible to have multiple layers of conduits inside each other, such that the inner conduit has a further inner conduit disposed within it along at least a portion of its length.

The inner surfaces of any of the conduits may be coated with a material different from the material of the conduit walls, for instance a catalyst. Further, the interior or exterior surfaces of one or more conduits may be provided with one or more protuberances. The protuberances may be fluid directing formations, may provide heat transfer into a fluid or an adjacent conduit or may provide structural support to the conduit. For example, the protuberances may take the form of fins, which might be perpendicular to the longitudinal axis of the duct, or spiral, or take the form of pins at any angle to the axis of the duct. As an example, by providing "stays" within the duct, it is possible to strengthen the duct and reduce the wall thickness for a given pressure to be contained and hydraulic diameter. The protuberances may be perforated to either enhance their function, to equalize fluid pressure or to reduce weight. The protuberances may include stays which attach an inner conduit to an outer conduit, or which attach adjacent conduits together or to other elements of the body of the heat exchanger. To help reduce stresses, the protuberances may be curved in one or more of any planes. To improve heat exchange rates the thickness of the protuberances may vary over its length. The protuberances can be used to enable the construction of lightweight "honeycomb" structures of conduits joined by the minimum amount of metal or the like necessary for heat transfer, structural cohesion and stability. These structures are more suitable for coping with the stresses and distortions caused by high temperatures and/or pressures, and may be more rapidly manufactured, than quasi-solid blocks such as those provided by diffusion bonding. This enables the provision of a lighter, cheaper and more rapidly manufactured compact heat exchanger, which is less prone to stress from differential temperature gradients.

The conduits may be formed from welded tubes. Welded tube is made by rolling up flat strip and welding the edges. Protuberances may be laser remelted on to the surface of the strip that becomes the inner surface of the tube, and then the tube completed in the normal way. In this way it becomes possible to put fluid controlling protuberances inside a fine tube, which is otherwise difficult.

For certain applications it may be desirable to provide the heat exchanger with an integral combustor for generating heat. The combustor may have walls of remelted, porous materials, such as ceramics or high nickel alloys, and may be housed in, and possibly sealed within, a chamber formed during the laser remelting process. The combustor itself could also be formed, either separately from the heat exchanger, or monolithically with the heat exchanger, by laser remelting. To control combustion within the combustor and/or the heat exchanger, a combustion controller may be provided which includes for example glow plugs, resistance wire igniters, thermocouples, flame detectors, pressure sensors and similar structures. The combustion controller elements may be placed in appropriate positions during the manufacture process or apertures and fittings may be provided during manufacture for their subsequent insertion. Combustion may also be controlled to take place within one or more of the conduits either instead of or as well as in the combustor chamber. The combustor may be arranged to receive pre-mixed fuel and combustion air, or may alternatively be arranged to receive the fuel and combustion air separately, the fuel and combustion air being mixed within the heat exchanger. In the latter case, the mixed fuel and combustion air may be combusted at predetermined locations within the heat exchanger. Porous ceramic materials or other combustion catalysts may be included in the construction of the combustion chamber and/or conduits to promote ignition and combustion. Such materials may be provided in the form of layers, coatings, inserts or meshes put in place during the remelting process or inserted, flowed or injected into the conduits or combustion chamber after the remelting process has been completed.

The heat exchanger may be integrated with other components of a complete system, such as, in the case of a Stirling engine, the regenerator and/or the cooler. Each of the latter can be built up in the same way and at the same time as the heat exchanger, thus eliminating any manifolds between the three components. Alternatively, manifolds may be manufactured in the same way, to include fluid passages. In a Stirling engine, the charge gas may be arranged to flow through the inner fluid passage of two fluid passages, and the combustion gases through an axially finned annulus between the inner passage and the main body of the heat exchanger.

Preferably a Stirling engine may consist of two cylinders with their pistons, on the same longitudinal axis, with the heater, regenerator and cooler aligned between them. Preferably, in such an arrangement, the heater consists of a bundle of a large number of short straight fine bore tubes. A suitable combustor may provide cross flow or counterflow heat transfer. Cross flow may be arranged by an annular duct, which directs the combustion gases on different paths between the tubes, the stays and fins being formed and arranged so as to allocate the passage of the combustion gases between different tubes or groups of tubes so as to equalize the temperature across a plane of the cylindrical array, perpendicular of the axis of the cylinder. The distribution of the tubes across that plane may vary, to assist this equalization of temperature distribution, and there may be variations in tube diameter and in the number and form of protuberances to achieve this. The duct may be divided into segments that might be unequal in order to direct the appropriate amount of the combustion gases between specific tubes or groups of tubes.

Counterflow may be provided by an inlet and an outlet manifold, each of which is formed from energy beam remelting, and one of which forms the pressure closure for the hot cylinder. Each manifold may itself divide into a series of ducts whose dimensions and shape are designed to direct specific proportions of the total combustion gases between specific tubes or groups of tubes, in order to equalize the heat transfer into each tube. It will be clear that each tube must pass through the manifold in order to be accessible from the cylinder itself.

In the case of a gas turbine, a recuperator and the combustor can be integrated. In the case of carburetted gas turbines, a recuperator, an internal combustion heat exchanger and the combustion space can be integrated into one monolithic block.

Conduits may also be provided to recycle exhaust gases back to the combustor. Further conduits may be provided to enable steam to be injected into the heat exchanger either to promote reaction or to clean out the conduits within the heat exchanger when using contaminated fuels, such as those from biomass gasifiers.

An embodiment of the invention provides a monolithic heat exchanger formed by a laser remelting process in accordance with the above methods.

Another aspect of the invention provides a heat exchanger formed by a laser remelting process, comprising:

a monolithic heat exchanger body having a plurality of conduits passing through it and having substantially continuously curved outer cross-sections.

Figure 2A:
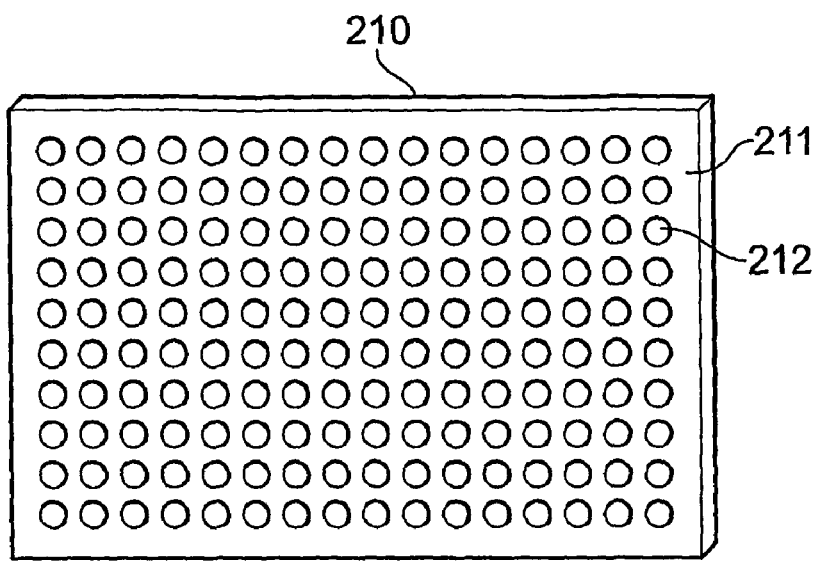
Figure 2B:
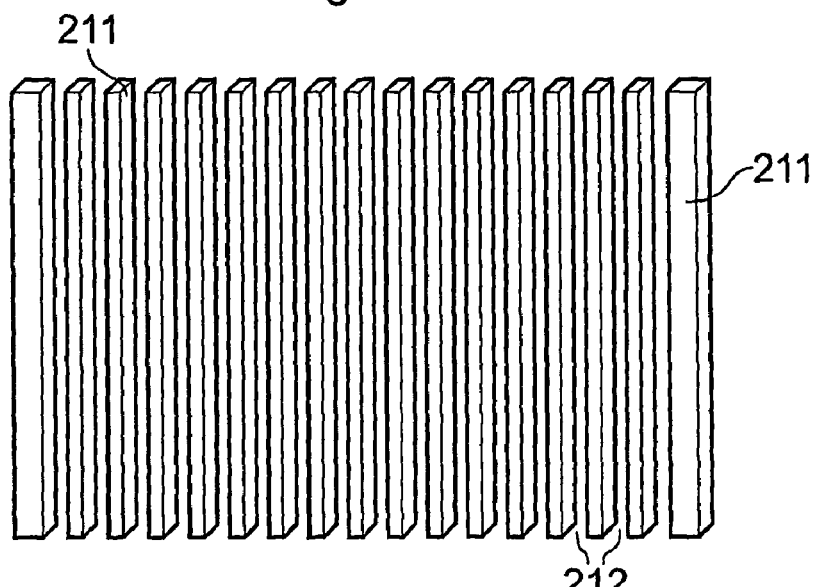
Figure 2C:
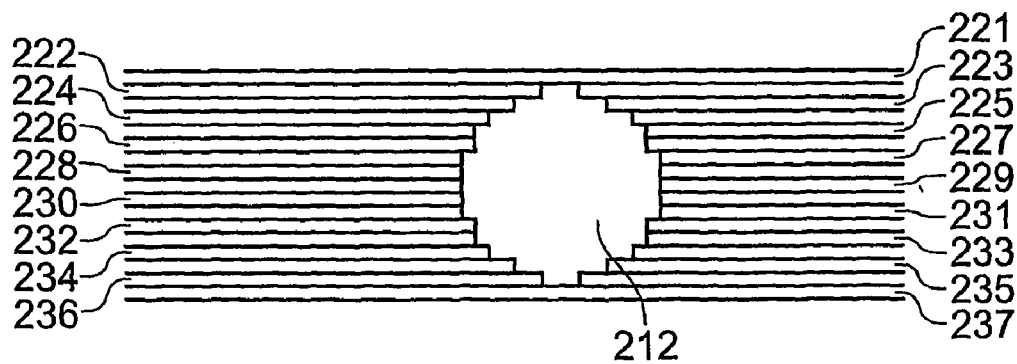
Figure 3A:
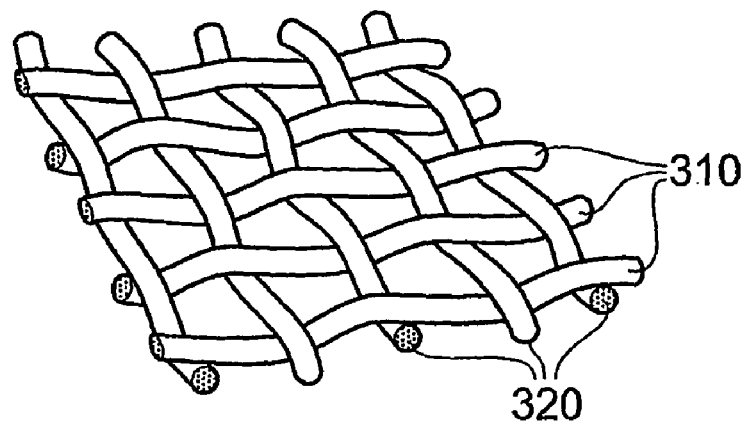
Figure 3B:
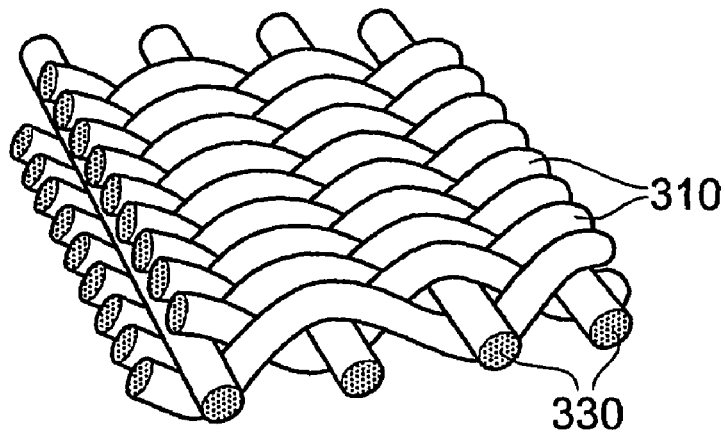
Figures 4A, 4B:
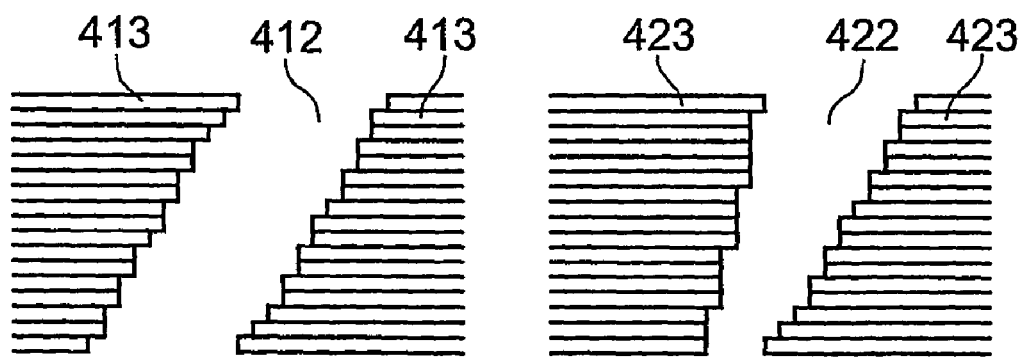
Figure 5:
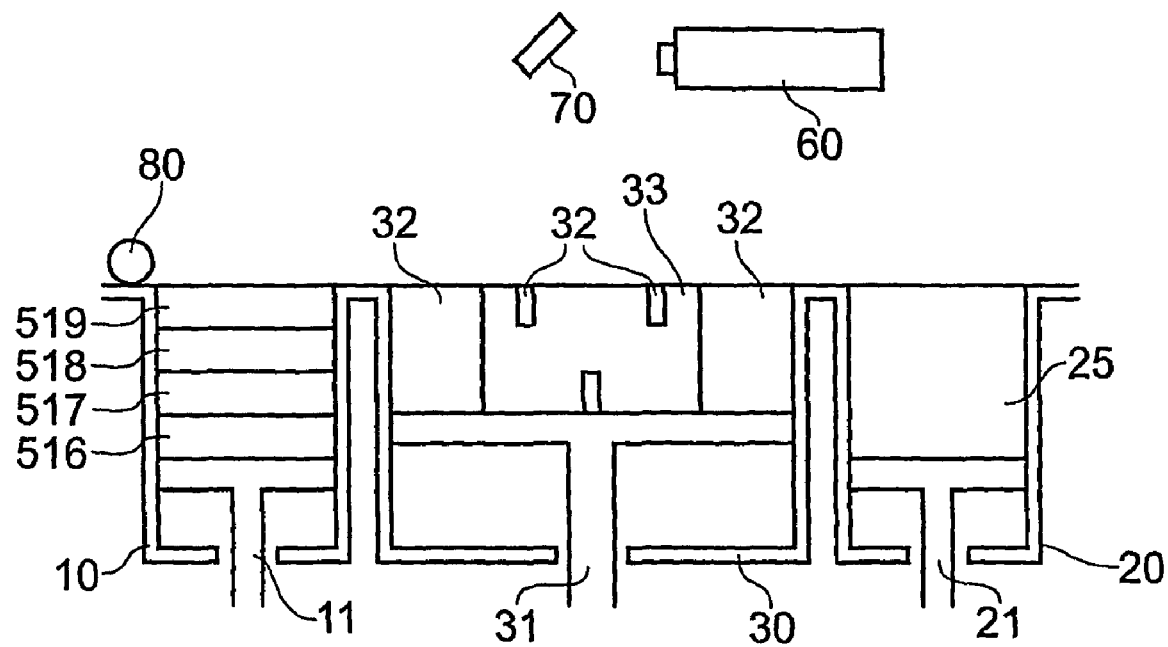
Figure 6:
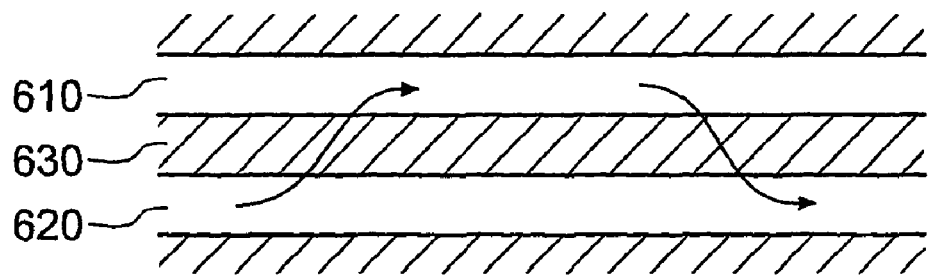
Figure 8:
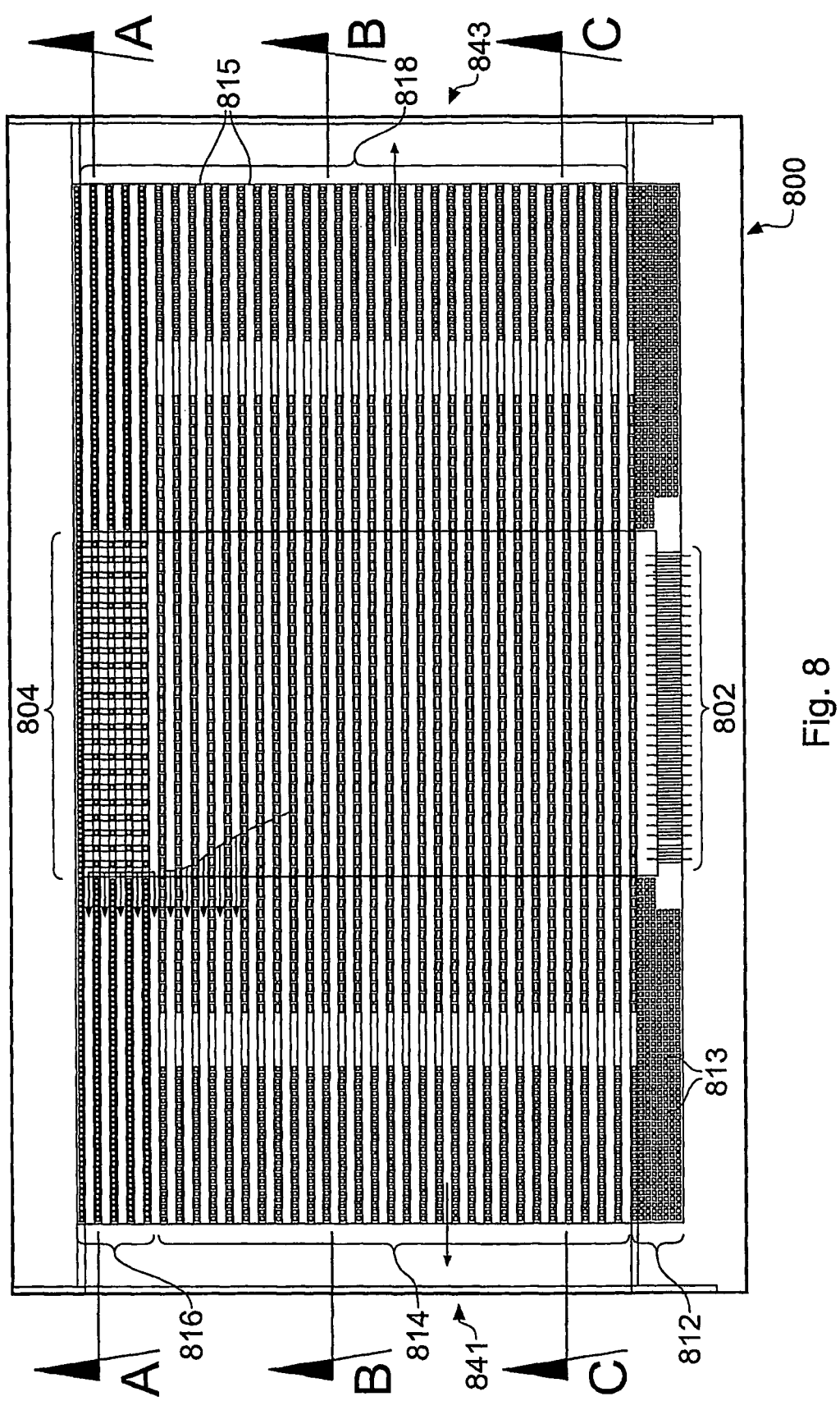
Figure 9:
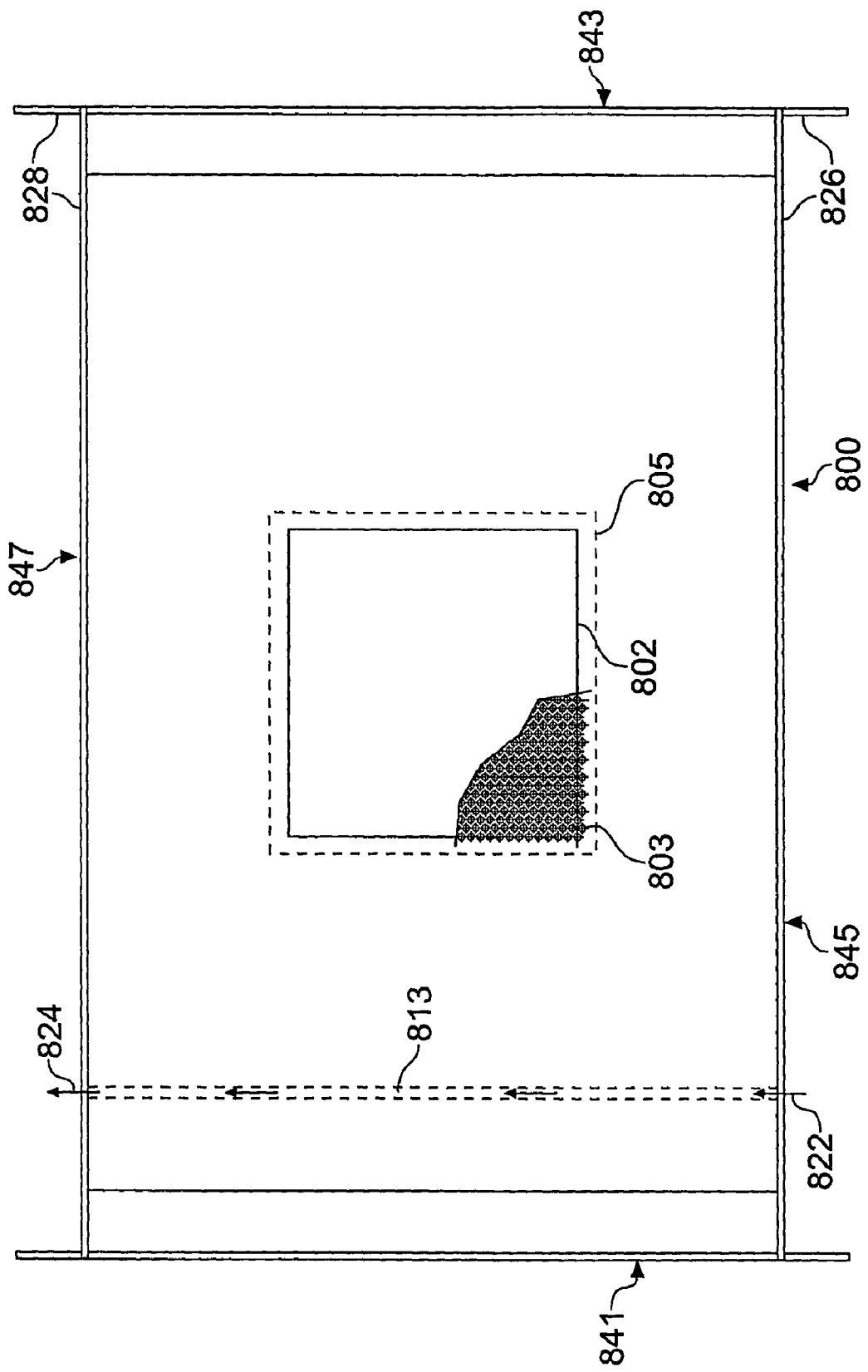
Figure 10:
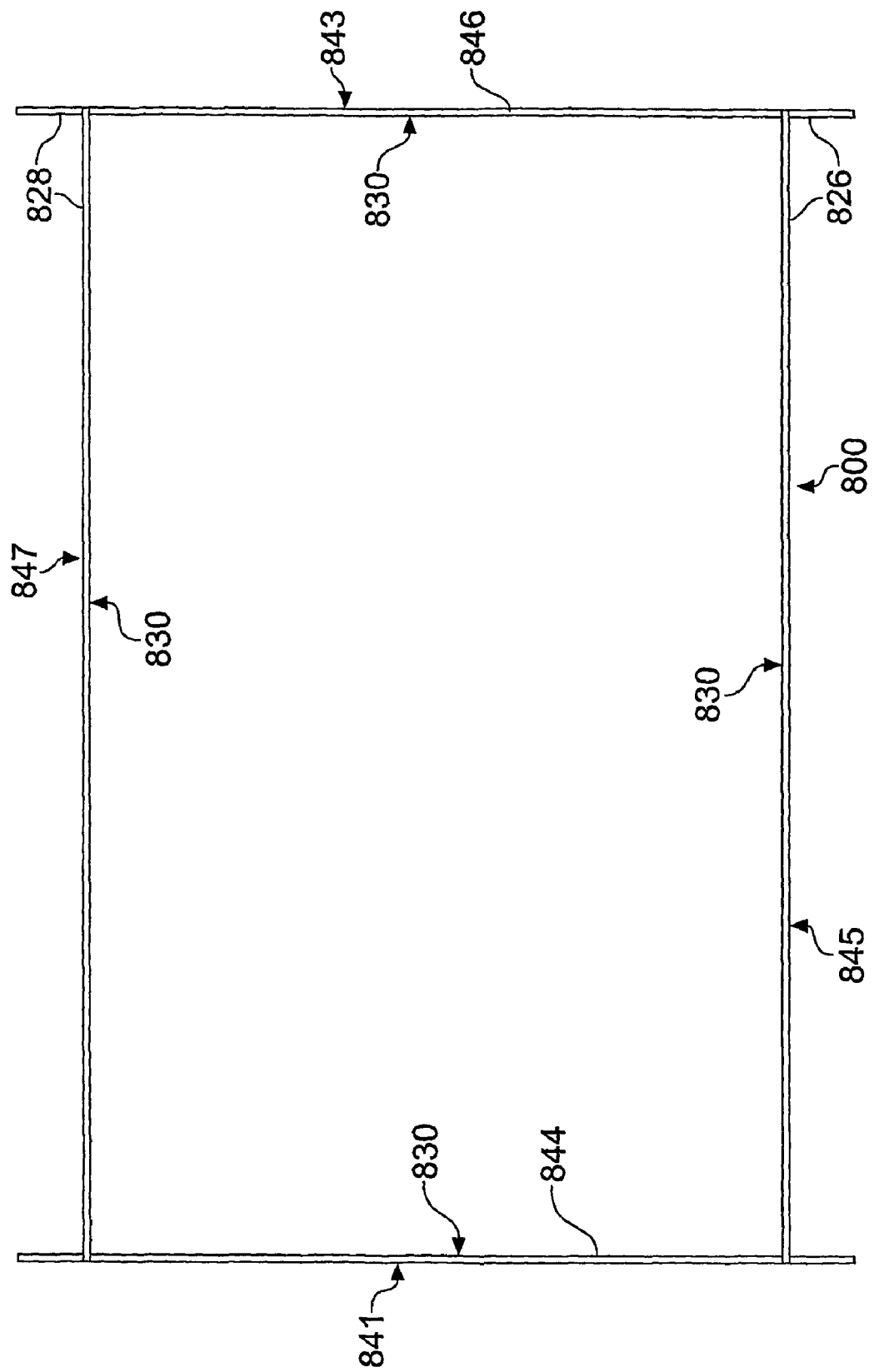
Figure 11:
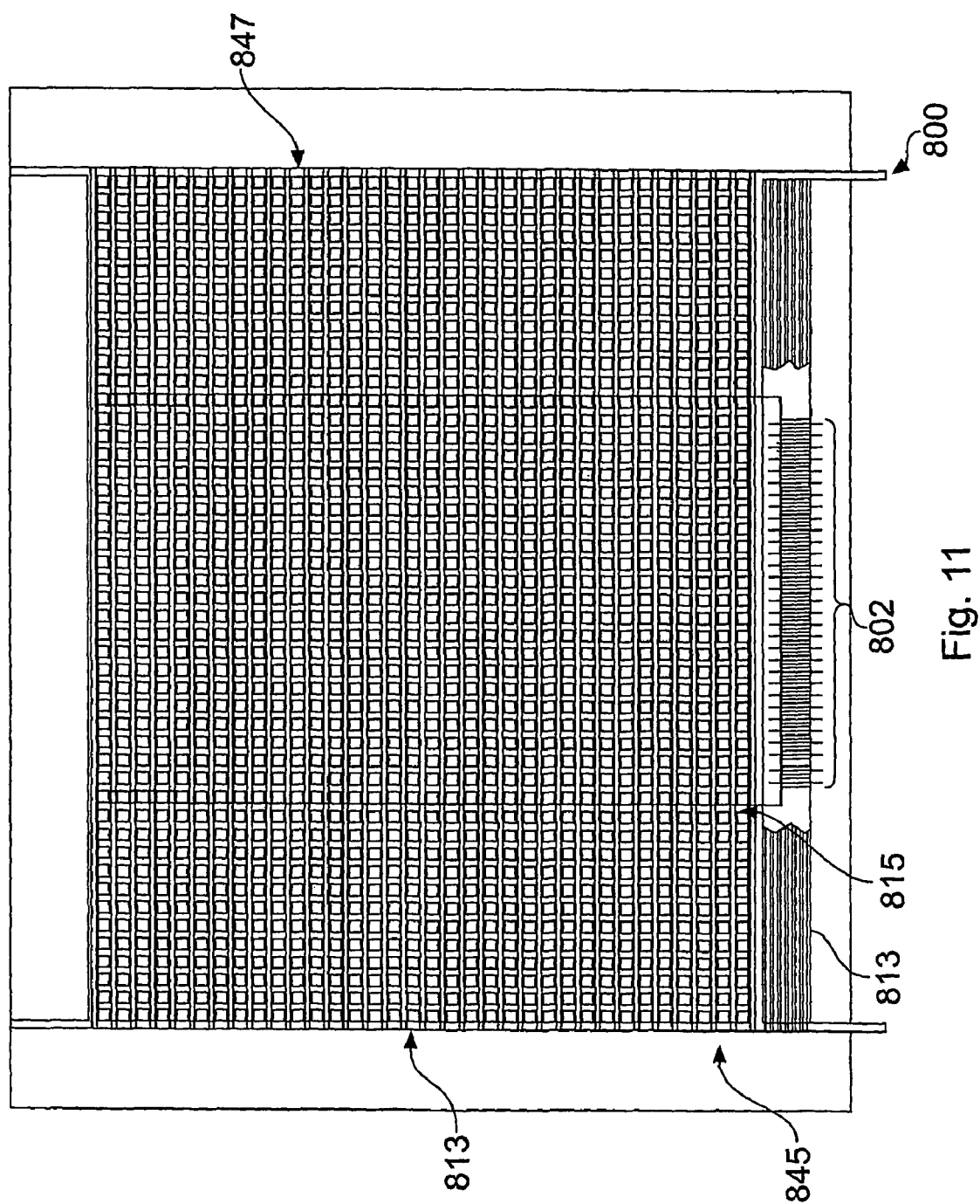
Figure 12:
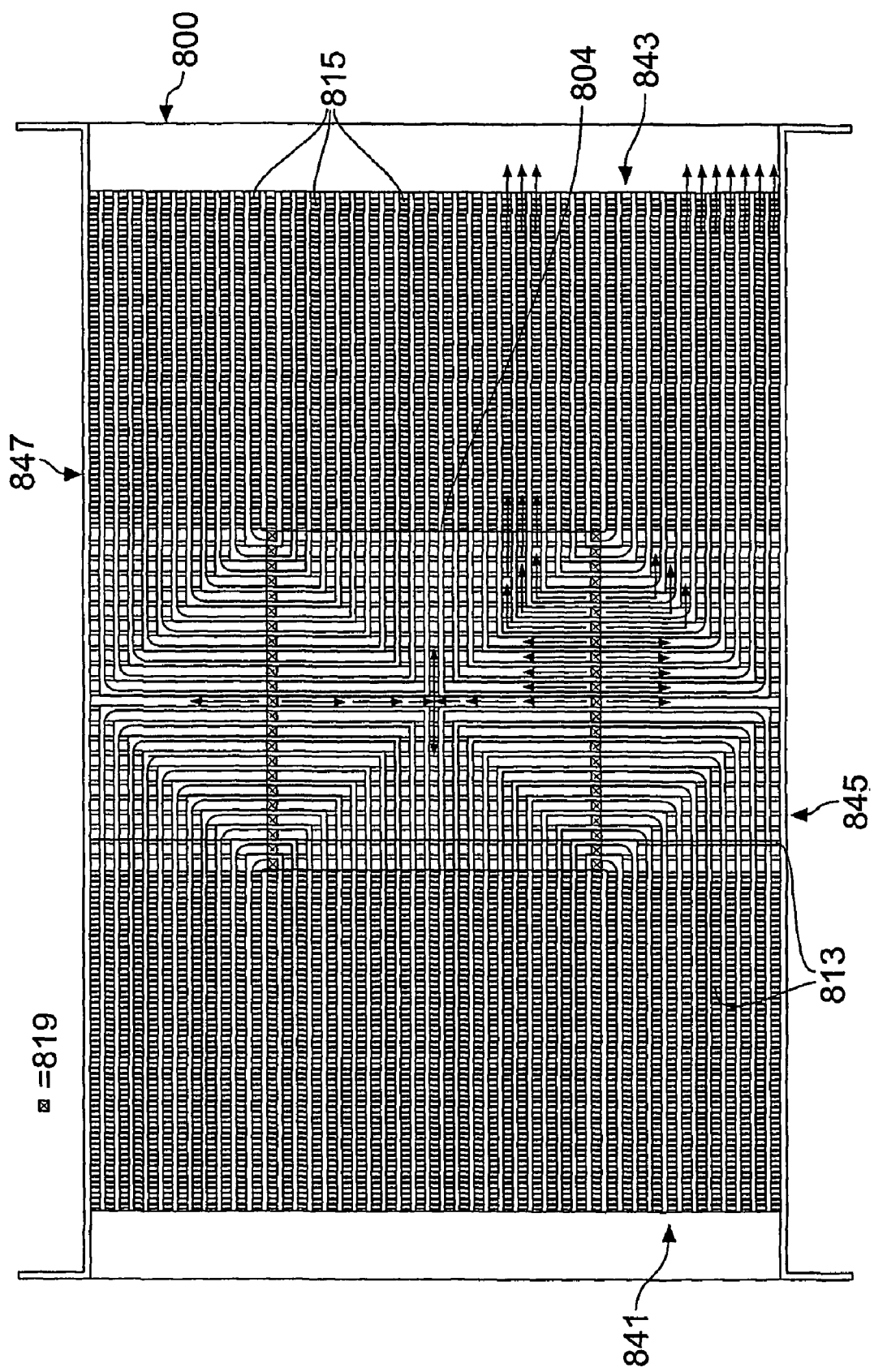
Figure 13:
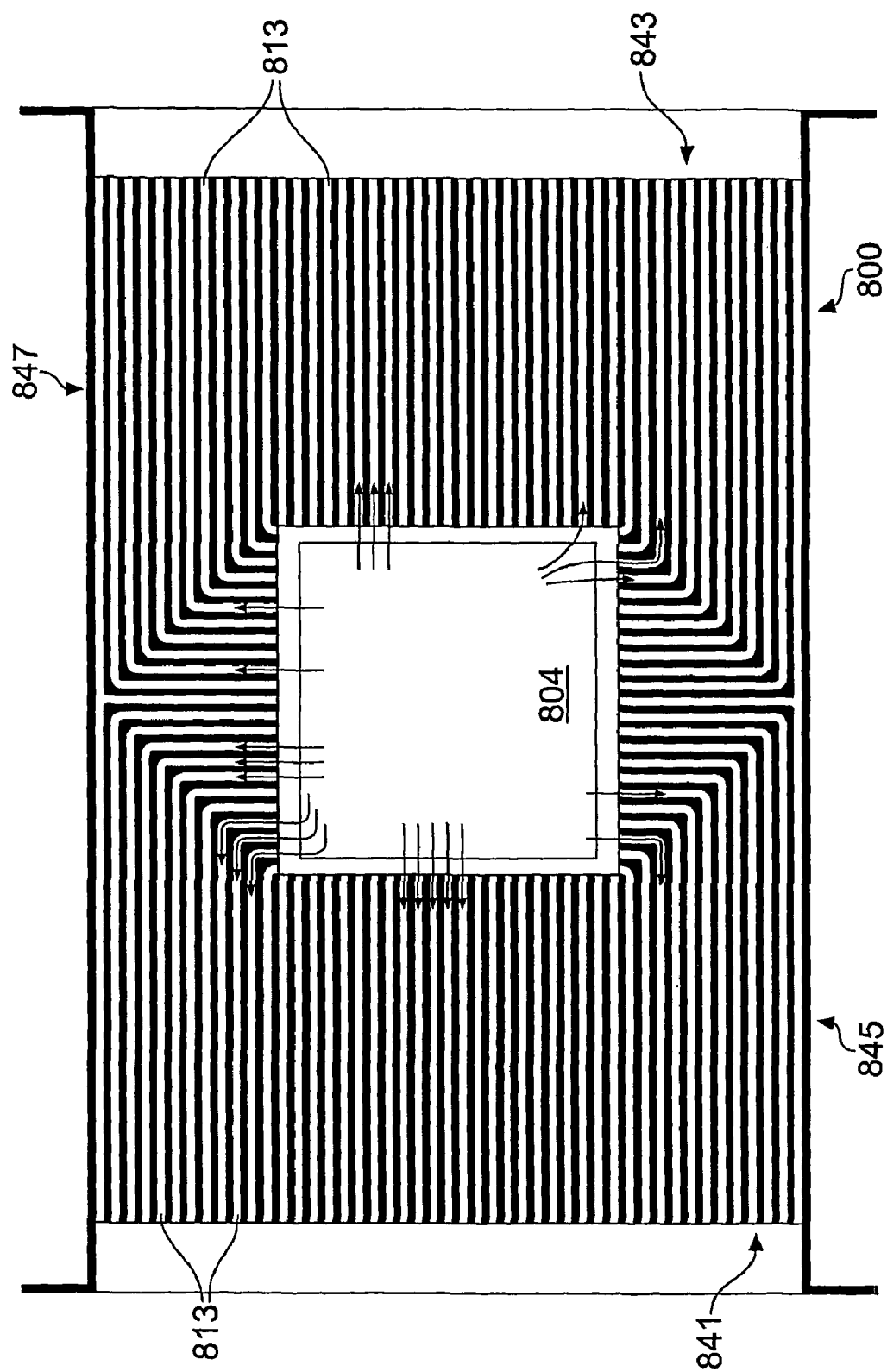
Figure 14:
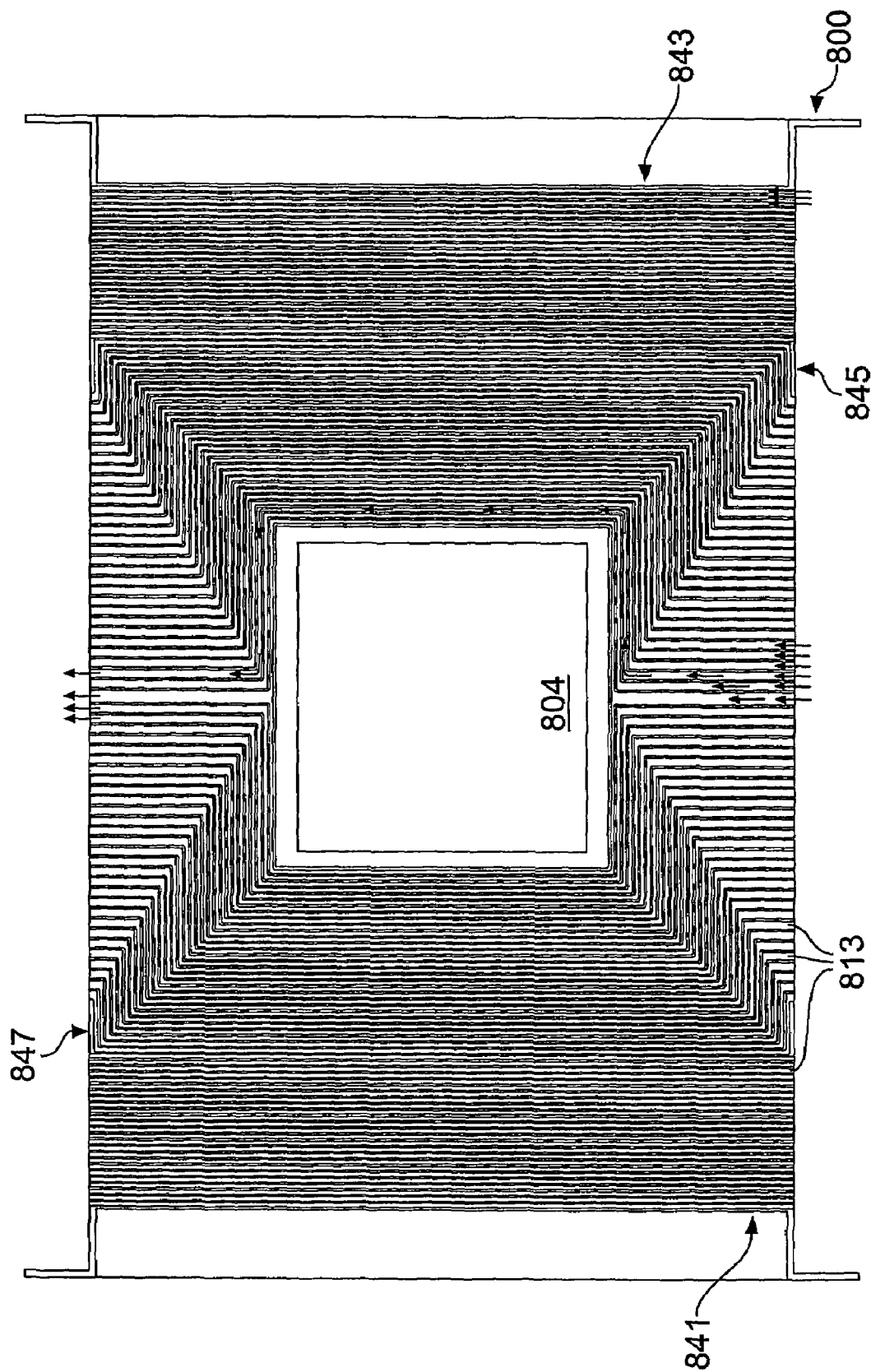
Figure 15B:
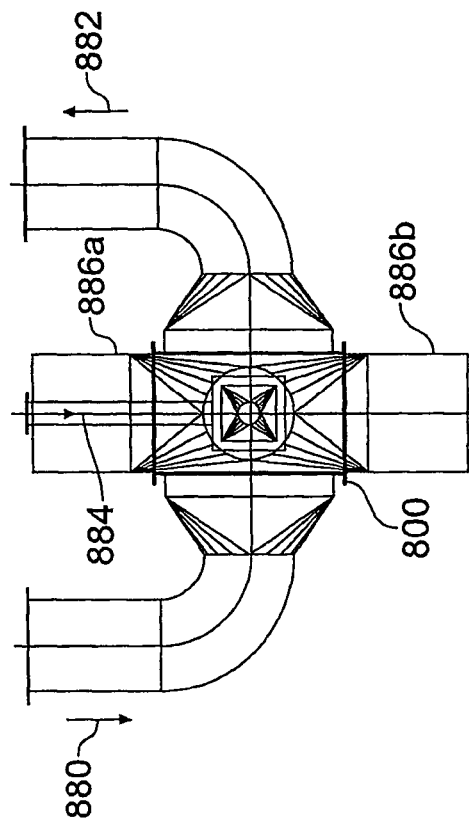
Figure 15C:
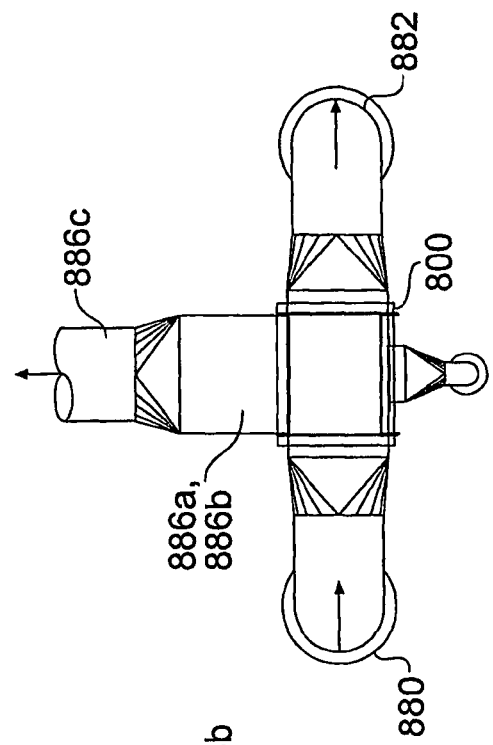
Figure 15A:
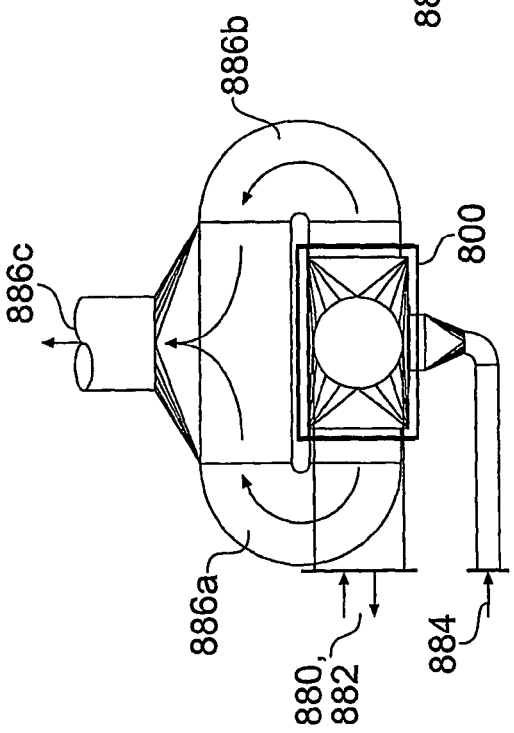
Figure 16:
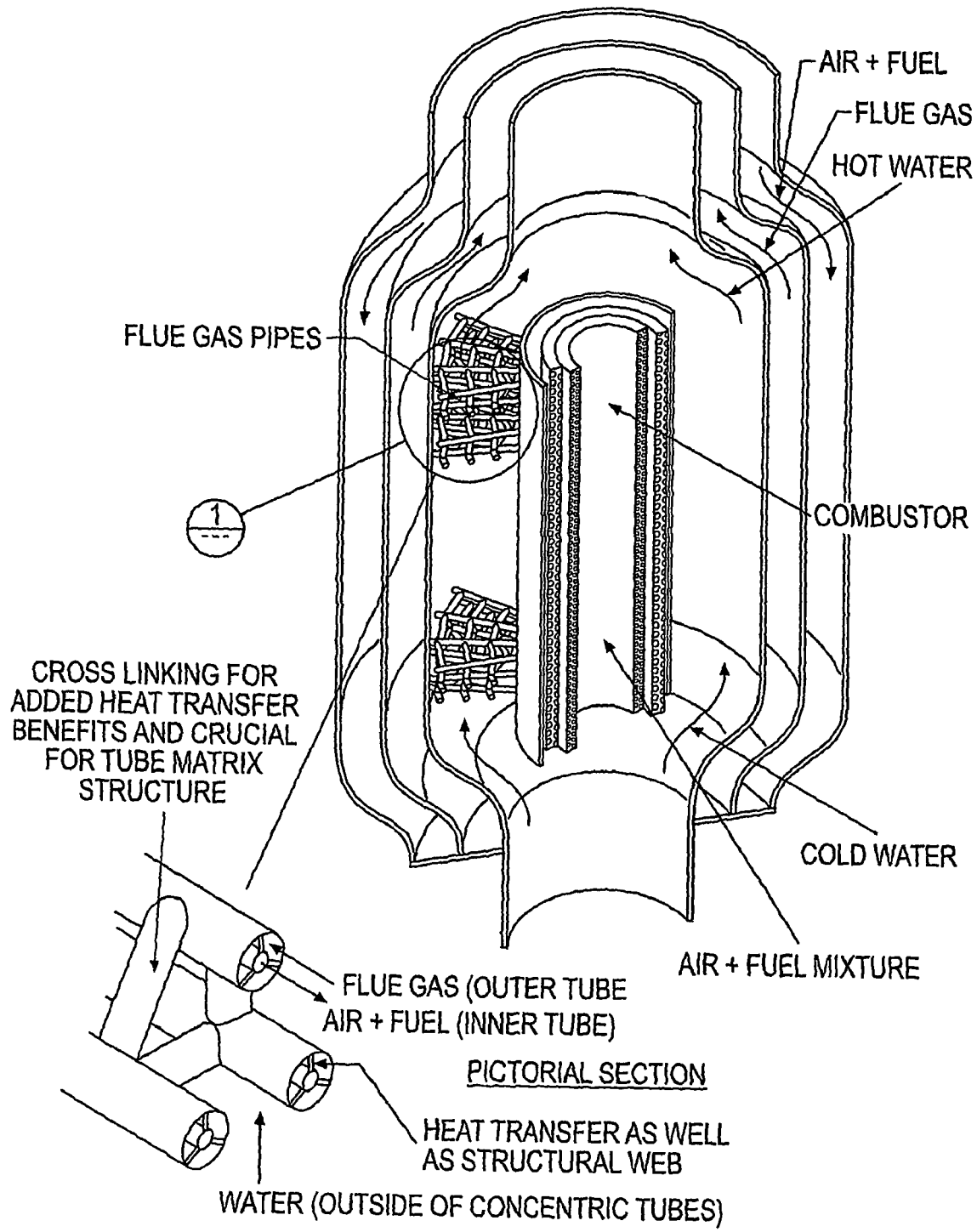
Figure 17:
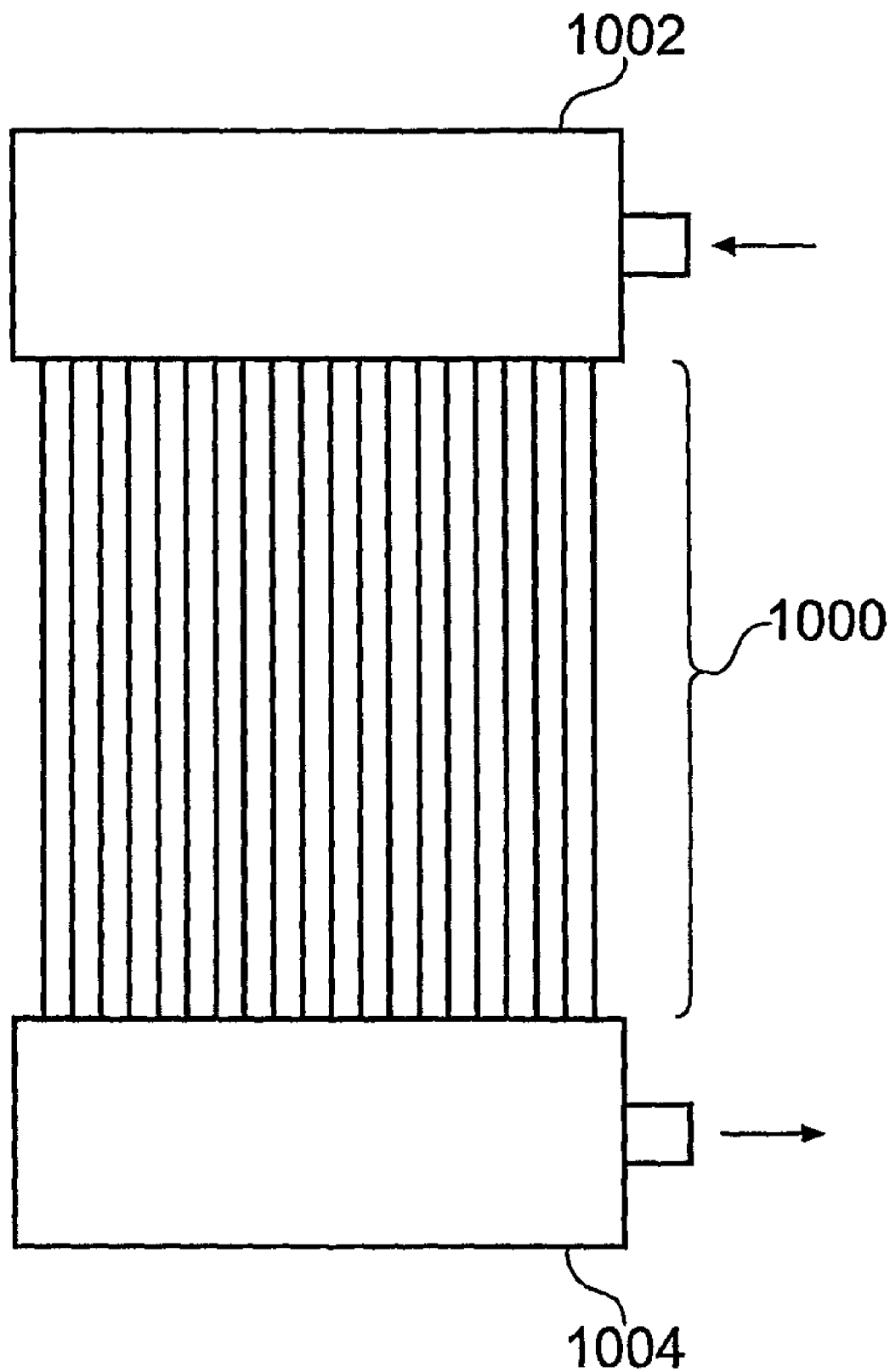

Embodiments of the invention will now be described, by way of example only, with reference to the accompanying drawings in which:

FIGS. 1A to 1D schematically illustrate an example laser remelting process by which a heat exchanger can be constructed;

FIGS. 2A to 2C schematically illustrate example designs for remelted layers;

FIGS. 3A and 3B schematically illustrate a "weave" type conduit arrangement which may be provided in embodiments of the present invention;

FIGS. 4A and 4B schematically illustrate example conduit arrangements;

FIG. 5 schematically illustrates a laser remelting process in which several different materials are provided for the construction of different layers of the heat exchanger;

FIG. 6 schematically illustrates two heat exchanger conduits having a separating wall which is porous to allow a degree of mixing between the fluids within the two conduits;

FIGS. 7A to 7D schematically illustrate heat exchanger conduit arrangements in which an inner conduit is provided inside an outer conduit;

FIG. 8 schematically illustrates a side view of a heat exchanger and combustor combination according to an embodiment of the invention;

FIG. 9 schematically illustrates a bottom view of the heat exchanger and combustor combination of FIG. 8;

FIG. 10 schematically illustrates a top view of the heat exchanger and combustor combination of FIGS. 8 and 9;

FIG. 11 schematically illustrates an end view of the heat exchanger and combustor combination of FIGS. 8 to 10;

FIG. 12 schematically illustrates a first cross section of the heat exchanger and combustor combination of FIGS. 8 to 12;

FIG. 13 schematically illustrates a second cross section of the heat exchanger and combustor combination of FIGS. 8 to 12;

FIG. 14 schematically illustrates a third cross section of the heat exchanger and combustor combination of FIGS. 8 to 12;

FIGS. 15A to 15C schematically illustrate an example duct work arrangement of a heat exchanger according to an embodiment of the invention;

FIG. 16 schematically illustrates a heat exchanger for a water heater at least partially manufactured in accordance with the present techniques; and FIG. 17 schematically illustrates a heat exchanger with manifolds made by laser remelting and having prefabricated conduit tubes.

Referring to FIGS. 1A to 1D, a laser remelting process suitable for manufacturing a heat exchanger in accordance with embodiments of the present invention is described.

Discussion of this type of manufacturing process can be found in the books Rapid Manufacturing: The Technologies and Applications of Rapid Prototyping and Rapid Tooling by D. T. Pham, S. S. Dimov, Springer-Verlag UK, May 2001 and Laser-Induced Materials and Processes for Rapid Prototyping by L. Lu, J. Fuh and Y.-S. Wong, Kluwer Academic Publishers (2001).

In FIG. 1A, two powder supply chambers 10 and 20 are provided, each containing a powder 15, 25 which is suitable for remelting to form a heat exchanger in accordance with a given specification. The level of the powder 15, 25 within the powder supply chambers 10, 20 is controlled within each chamber by pistons 11, 21. A remelting chamber 30 is provided, and it is within this chamber that powder may be remelted to form a solid structure by exposure to a laser beam. The laser beam is generated by a laser 60 and is directed onto a desired region of a layer of powder within the remelting chamber 30 using a directional control mirror 70. Within the remelting chamber 30 there is shown unremelted powder 32 and a remelted structure 33 which is a heat exchanger in a current state of production. The level of the powder 32 and the remelted structure 33 within the remelting chamber 30 is controlled by a piston 31. At each stage in the process that a new layer needs to be provided within the remelting chamber 30, the powder 15, 25 within one of the powder supply chambers 10, 20 is distributed to the remelting chamber 30 by a roller 80.

Figure 1B:
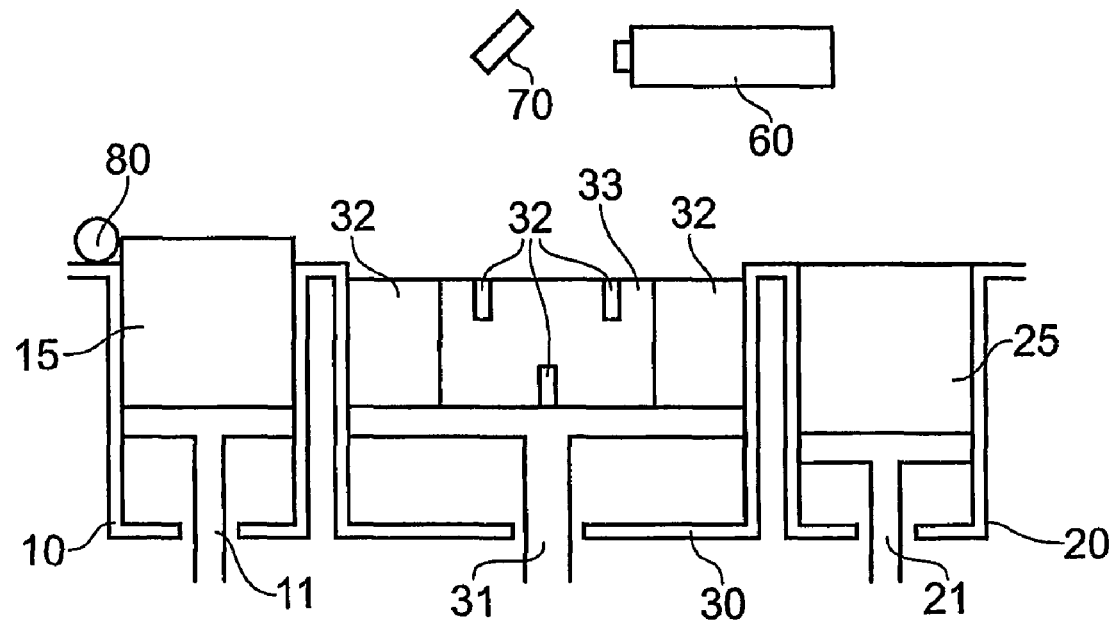

Referring to FIG. 1B, a process for setting up a new powder layer within the reremelting chamber 30 is initiated. The piston 11 within the powder supply chamber 10 raises the level of the powder 15 within the powder supply chamber 10 above the level of the partition separating the powder supply chamber 10 and the reremelting chamber 30. Additionally, the piston 31 within the reremelting chamber 30 lowers the level of the powder 32 and the reremelted structure 33 within the chamber to provide space for the new powder layer.

Figure 1C:
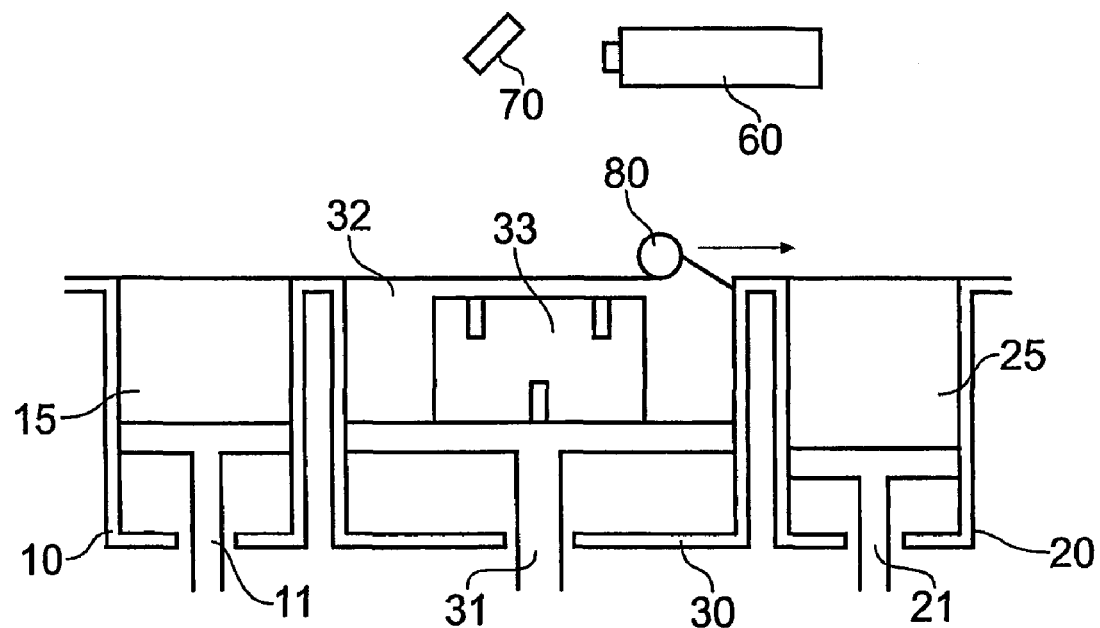

Referring now to FIG. 1C, the roller 80 pushes the protruding top portion of powder 15 from the powder supply chamber 10 into the remelting chamber 30 and spreads it evenly over the existing powder 32 and the remelted structure 33 to form a new powder layer in the remelting chamber 30. In the present embodiment, the roller 80 continues on to the far right hand side of the apparatus. This enables the above process to be repeated subsequently using powder from the right hand side powder supply chamber 20, with the roller 80 moving from right to left across the apparatus. The powder delivery process can therefore alternate between left-to-right and right-to-left operation. Other embodiments of the invention may provide only a single powder supply chamber 10 or 20, with the roller returning to its start position prior to the delivery of each new layer.

Figure 1D:
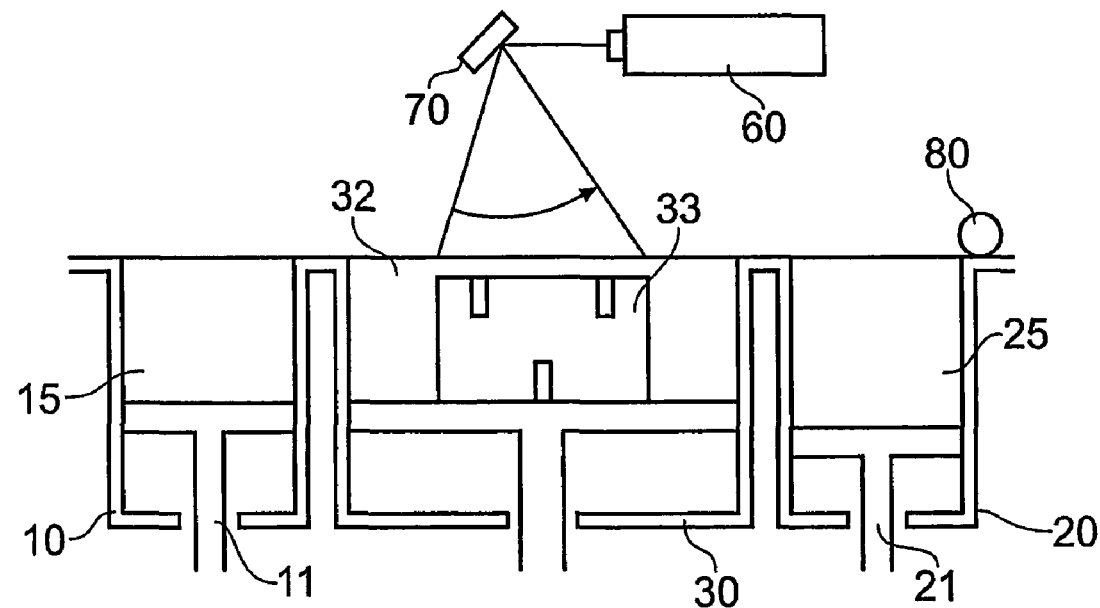

Referring to FIG. 1D, the laser 60 is switched on and applies a beam of laser light to predetermined regions of the surface of the fresh layer of powder in the remelting chamber 30. Control of the laser beam is effected using the control mirror 70 which causes the laser beam to be scanned across the surface of the powder layer in the remelting chamber 30. The laser beam may be either pulsed or continuous wave, and will have characteristics, such as intensity and wavelength, suitable for remelting the particular powder chosen. The control mirror 70 is controlled by a data processing apparatus (not shown) which specifies the predetermined regions of the current layer of powder which are to be remelted in accordance with a two-dimensional slice of a three-dimensional design describing the structure to be manufactured.

Preferably, the powder and remelted structure within the remelting chamber 30 are heated to a temperature just below the remelting point of the powder prior to the application of the laser beam. This reduces the incidence of temperature differential stresses within the remelted structure. The remelting chamber 30 may also be filled with inert gas (e.g. nitrogen) to prohibit the oxidation of the powder material at the elevated temperature.

Other laser remelting methods are envisaged. For instance, a different powder delivery mechanism may be provided, such as laying down the powder layers as "sheets" of material or delivering a layer of powder directly into the remelting chamber 30 via a dispenser. Also, the powder delivery process and the remelting process could be performed substantially simultaneously if a powder delivery mechanism were to provide the powder to a predetermined region of the remelting chamber 30 at the same time that the laser beam is applied to the predetermined region. The term "laser remelting" can be taken to mean any method of forming a solid structure from raw materials by selectively remelting or re-remelting the raw materials using a laser beam.

FIG. 2A schematically illustrates a two-dimensional slice which can be constructed using the method described above with reference to FIGS. 1A to 1D. The holes passing through the slice represent unremelted regions of the layer of powder and the remaining area of the slice represents remelted regions of the layer of powder. In this example, the holes represent building blocks for conduits running vertically through the heat exchanger structure. When the remelting process is complete, the holes will bisect several layers of the structure.

FIG. 2B schematically illustrates another two-dimensional slice which can be constructed. In this case, conduits are disposed parallel to and within the plane of the slice. Accordingly, because the diameter or bore of the conduits is greater than the thickness of a single layer of powder, the remelted regions of the powder layer are separated from one another by unremelted regions of the powdered layer. It is noted that in this example embodiment a layer is the smallest building block provided for in the vertical direction by the laser remelting process and accordingly a conduit cannot be constructed which is smaller than one layer. Although the remelted regions in FIG. 2B are separated from each other in the plane of the layer, they will be indirectly connected to each other via remelted material in other layers.

FIG. 2C illustrates a conduit running parallel to and within the plane of several layers of the remelted structure. 17 layers are illustrated (221-237), with the uppermost layer 221 and the bottom-most layer 237 being uninterrupted by the unremelted region 212. The remaining 15 layers are all interrupted by the unremelted region 212 which defines the conduit running through the structure. It can be seen from FIG. 2C that the laser remelting process, due to the fact that it operates on discrete layers, will in some circumstances result in a "stepped" surface being provided on any remelted structure which transcends more than one layer of powder (this is shown in an exaggerated form in the diagram). In some cases these sharper edges may be desirable to promote mixing. In other cases they may not be desirable and may accordingly be removed after the remelting process has been completed, in the case of the conduit of FIG. 2C this could for instance be carried out by passing an abrasive or corrosive liquid through the conduit.

It will be appreciated that the selective laser remelting process described above is only one example of possible energy beam remelting processes which may be used. As an example, electron beam remelting could be used instead of or in combination with laser remelting.

The laser remelting process described above enables the realization of complex three-dimensional designs. In the case of a heat exchanger, this enables intricate relationships and interactions between conduits running through the body of the heat exchanger. FIG. 3A schematically illustrates an interwoven arrangement of a first set of curved conduits 310 and a second set of curved conduits 320 running in a general direction which is at a right angle to the general direction of the first set of curved conduits 310. Such an arrangement can be used to reduce spaces between adjacent conduits and to increase heat transfer rates and porosity. Other advantages may be obtained in the form of a reduction in size, weight and cost of the heat exchanger. FIG. 3B schematically illustrates an arrangement similar to that of FIG. 3A, but in which one set of curved conduits 330 comprises straight conduits, with the other set of curved conduits 310 providing the necessary curvature for the two sets of conduits to be interwoven.

FIGS. 4A and 4B schematically illustrate example conduit arrangements in which the length of the conduit extends in a direction having a vertical component, the length of the conduit transcending a large number of remelted layers. In FIG. 4A, a conduit having a substantially constant cross section or bore is shown. It can be seen again that the walls of the conduit are not smooth due to the discrete nature of the process in the vertical axis. In FIG. 4B, a conduit having a varying cross section is shown, once again transcending many remelted layers. Providing variation in the cross sectional area or shape of a conduit enables control of flow characteristics and heat transfer characteristics and the like.

FIG. 5 schematically illustrates a method by which material characteristics of a remelted structure can be varied as a function of vertical position (i.e. by layer or layers) by providing that different layers within the remelting chamber 30 are provided with powder comprised of a different material. In the example of FIG. 5, this is achieved by providing layers of powder within the powder supply chamber 10 comprising different materials. When a new layer of powder is to be distributed into the remelting chamber 30, the piston 11 within the powder supply chamber 10 will be raised up, exposing a top portion of a first powder type 519. Powder type 519 will continue to be used on subsequent iterations of the powder delivery process until the supply of powder type 519 has be exhausted. At this stage, further iterations of the powder delivery process will use powder type 518, until powder type 518 has been used up. This process will continue on through powder types 517 and 516 until the laser remelting process is complete. Other methods for controlling the characteristics of the remelted material are also available. For instance, the remelting process itself could be varied, for instance by changing the dwell time of the laser beam on a given region of a layer, or by varying the temperature in the layer induced by the laser beam.

An example of the effects of varying the material characteristics of the structure can be illustrated with reference to FIG. 6, which shows a first conduit 610 and a second conduit 620. The first conduit 610 and the second conduit 620 are separated by a wall 630. The wall 630 has been manufactured with a porosity (either with discrete apertures or a generally porous structure) allowing fluid transfer between the first conduit 610 and the second conduit 620. By varying the porosity of the wall 620 using the above described processes it is possible to specify how easily a fluid may transfer through the wall 630. In particular, the higher the porosity of the wall 630, the greater the fluid transfer rate. Allowing the transfer of a fluid between two conduits in this way enables mixing and/or reaction of the fluids within the conduits.

Figure 7A:
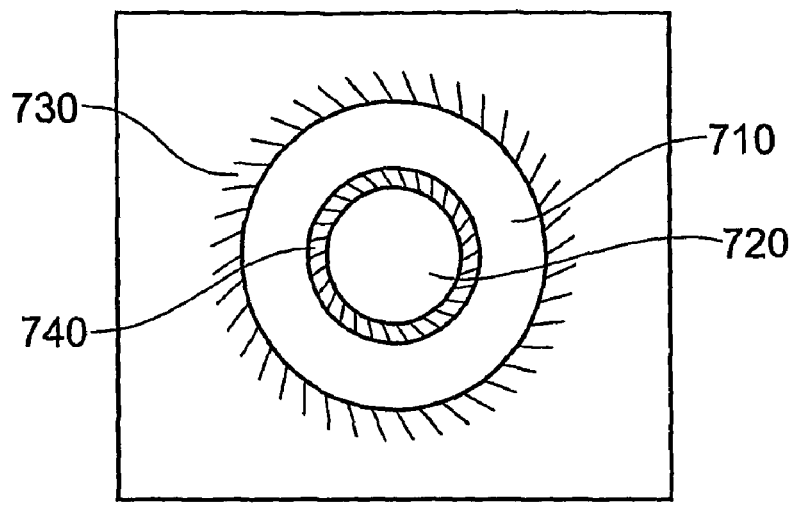
Figure 7B:
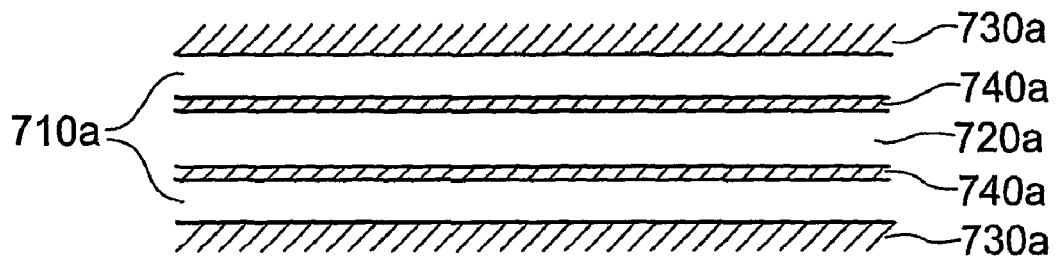

The manufacture of a heat exchanger by laser remelting advantageously allows conduits to be constructed within other conduits. This is illustrated schematically in FIG. 7A. Referring to FIG. 7A, an outer conduit 710 is provided within an area of material 730 which serves as a wall surrounding the outer conduit 710. Inside the outer conduit 710 there is provided an inner conduit 720 defined by a hollow tubular structure 740.

Figure 7C:
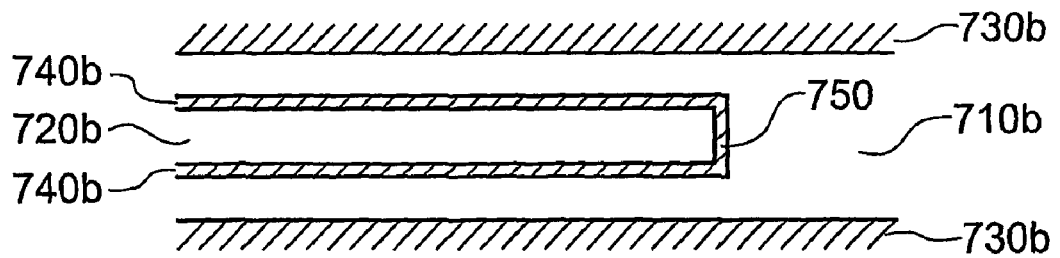

The inner conduit 720 may extend substantially the entire length of the outer conduit 710. This arrangement can be seen in FIG. 7B where a tubular structure 740a extends parallel to an outer wall 730a of the outer conduit 710a to form the inner conduit 720a. In an alternative arrangement, the inner conduit 720 may extend along only a portion of the length of the outer conduit 710 (and may pass through the outer conduit 710 as some point (not illustrated)). Two examples of this alternative arrangement are illustrated schematically in FIGS. 7C and 7D. In FIG. 7C, an inner conduit 720b comprises a tubular structure 740b which terminates part way along the length of the outer conduit 710b. Accordingly, beyond this point there is no structure present between the outer walls 730b of the outer conduit 710b. The tubular structure 740b terminates with an end portion 750 which either partially inhibits or entirely prevents fluid from exiting the inner conduit 720b through that end.

Figure 7D:
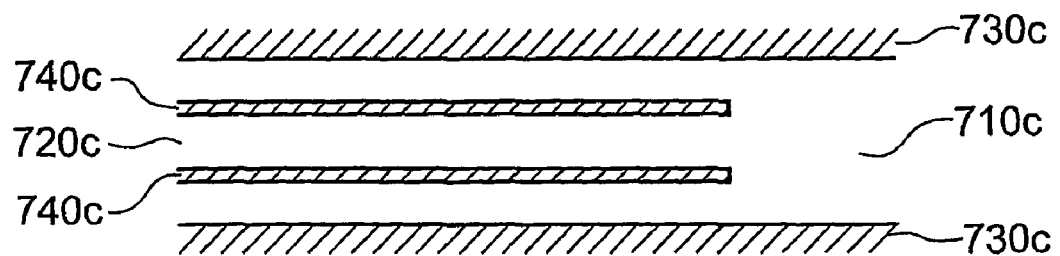

In FIG. 7D, an outer wall 730c of an outer conduit 710c and a tubular structure 740c of an inner conduit 720c are provided in an analogous way to FIG. 7C, but there is no end portion 750 to inhibit or prevent fluid flow from the end of the inner conduit 720c. Accordingly, at this point the fluids travelling along the inner conduit 720c and the outer conduit 710c mix and may, depending on the composition of the fluids, react.

In FIGS. 7A to 7D, the inner and outer conduits are concentric when viewed in cross section. The advantages obtained by the provision of one conduit within another conduit are not wholly reliant on this concentricity and the inner conduit may accordingly be slightly or substantially off centre, or the tubular structure 740 may even be in contact with the wall 730 of the outer conduit 710. Additionally, the inner and outer conduits need not be circular in cross section but may be elliptical or any other continuously curved shape. Depending on the length of the inner conduit 720, supports may be required either continuously or intermittently along the length of the inner conduit 720. These supports may take the form of struts or plates (a form of protuberance) extending between the tubular structure 740 and the outer wall 730.

The conduits can be formed with protuberances from their walls extending into the fluid flow and serving a variety of functions, such as providing increased heat transfer area, structural support, stays, triping laminar flow in turbulent flow (for better heat transfer) and forming aerodynamic valves to direct fluid flow through the heat exchanger (by providing more fluid flow resistance in one direction).

An example of a heat exchanger and combustor combination made in accordance with embodiments of the present invention will now be described with reference to FIGS. 8 to 15. The heat exchanger and combustor comprise a rectangular block having four side faces, a top face and a bottom face. Referring first to FIG. 8, a side elevation of a heat exchanger and combustor combination is schematically illustrated. The combustor in this case is an integral porous burner block 802 which is disposed in a cavity at the bottom of a heat exchanger body 800. The burner block 802 is operable when provided with an air/fuel mixture to combust the air/fuel mixture to generate hot exhaust gases. The air/fuel mixture will be supplied to the burner block 802 by a duct (not shown in FIG. 8, but described later with reference to FIGS. 15A to 15C) disposed beneath the heat exchanger body 800 and burner block 802 and coupled to the bottom face of the heat exchanger body 800. The hot exhaust gases generated by the burner block 802 will then rise into a burner chamber 804 disposed immediately above the burner block 802 and extending most of the way to the roof of the heat exchanger body 800.

The heat exchanger body 800 comprises a number of different regions in addition to the burner chamber 804 and the burner block 802. Starting from the bottom portion of FIG. 8, the heat exchanger body 800 includes a base portion 812 comprising 8 rows of charge gas conduits 813 represented by square or rectangular apertures. The charge gas conduits 813 have entry apertures into the heat exchanger body 800 at the positions shown in FIG. 8, extend through the heat exchanger body 800, and eventually terminate with exit apertures in the opposite face of the heat exchanger body 800. The rows of charge gas conduits 813 in the base portion 812 are not present along the full length of the face of the heat exchanger body 800 due to the presence of the burner block 802 in a central region of the base portion 812.

Above the base portion 812 is a main portion 814 which comprises 29 rows of charge gas conduits 813. A cross section through the line C-C of FIG. 8 is described later with reference to FIG. 14 and further illustrates the geometry of the charge gas conduits 813 within the main portion 814. In contrast to the base portion 812, in the main portion 814 of the heat exchanger body 800 the rows of charge gas conduits 813 are alternated in the vertical direction, that is, every other layer, with rows of exhaust conduits 815 running perpendicular to the charge gas conduits 813 from a face 841 to a face 843 of the heat exchanger body 800. The geometry of the exhaust gas conduits 815 will be described later with reference to FIG. 11 which illustrates a side elevation of the heat exchanger body 800 and FIG. 13 which illustrates a cross section through the line B-B of FIG. 8. The rows of charge gas conduits 813 are not interrupted in the central region of each row but they are interrupted within two smaller regions, one at the left side of each row and one at the right side of each row. These two interrupted regions enable charge gas conduits 813 having an entry point in the central region of each row to circumvent the burner chamber 804 as they transit through the heat exchanger body 800. The burner chamber 804 extends up to the top of the main portion 814 of the heat exchanger body 800.

Above the main portion 814 of the heat exchanger body 800 is a roof portion 816 which comprises 5 rows of charge gas conduits 813. In a similar way to the main portion 814, the rows of charge gas conduits 813 are alternated in the vertical direction with rows of exhaust conduits 815 running perpendicular to the charge gas conduits 813 from the face 841 to the face 843 of the heat exchanger body 800. However, in contrast with the main portion 814 there are no substantial interruptions to the rows of charge gas conduits 813, although the spaces between the entry points to the charge gas conduits are larger within the central region of each row (except for the top-most row). A cross section through the line A-A of FIG. 8 is described later with reference to FIG. 12 and further illustrates the geometry of the charge gas conduits 813 and the exhaust gas conduits 815 within the roof portion 814. Although the burner chamber 804 does not extend into the roof portion 816 of the heat exchanger body 800, vertical conduits provided within the central region of the roof portion 816 enable gases within the burner chamber 804 to pass into the central roof region 816 and then out through the exhaust conduits 815 within the roof region 816. In the present case, the face of the heat exchanger 800 which is opposite to the face illustrated in FIG. 8 is identical to the face shown, although in other example embodiments it may be different.

During operation, while combustion is taking place within the burner block 802 and hot exhaust gases are entering the burner chamber 804, a charge gas is arranged to pass into the entry points of the charge gas conduits 813, to flow through the charge gas conduits 813 within the heat exchanger body 800, and to exit the heat exchanger body 800 via exits points corresponding to the entry points. The charge gas will be supplied to the entry points of the heat exchanger body 800 via a duct, and the charge gas exiting from the heat exchanger body 800 will be collected via another duct. The duct arrangements will be described later with reference to FIGS. 15A to 15C. As the burner chamber 804 fills with hot exhaust gases, the pressure within the burner chamber 804 will rise, and will exceed the pressure within the exhaust conduits 815. This will cause the hot exhaust gases to be expelled from the burner chamber 804 to exit the heat exchanger body 800 via the exhaust conduits 815. The exhaust gases will travel both horizontally from the burner chamber 804 into the exhaust gas conduits 815 of the main portion 814 of the heat exchanger body 800, and also vertically into the central region of the roof portion 816 of the heat exchanger body 800 where it will then be able to exit horizontally via the exhaust gas conduits 815 within the roof portion 816 of the heat exchanger body 800. The exhaust gases exiting the heat exchanger body 800 will be collected by ducts (not shown) which are coupled to an end face 841 and an end face 843 of the heat exchanger body 800. The configuration of the ducts will be described later with reference to FIGS. 15A to 15C.

The hot exhaust gases are at a higher temperature than the charge gases passing through the heat exchanger body 800. The purpose of a heat exchanger is to provide for the transfer of heat between two fluids passing through the heat exchanger body 800. In the present arrangement the charge gas conduits 813 are disposed close to the exhaust gas conduits 815 enabling fast and efficient heat transfer from the hot exhaust gases to the charge gases through the walls separating the charge gas conduits 813 and the exhaust gas conduits 815.

Referring to FIG. 9, a bottom view of the heat exchanger and combustor combination of FIG. 8 is schematically illustrated. FIG. 9 shows the position of the burner block 802 at the centre of the base of the heat exchanger body 800. A cutaway section of the burner block 802 reveals a plurality of pores 803 into which the air/fuel mixture is injected for combustion. The position of the burner chamber 804, disposed above the burner block 802 is represented by dashed lines 805. The position of an example one of the charge gas conduits 813 within the base portion 812 of the heat exchanger body 800 is shown, and includes an entry point 822 where charge gas is injected into the heat exchanger body 800, and an exit point 824, where charge gas is expelled from the heat exchanger body 800 after being heated within. A charge gas inlet duct (not shown) is coupled to a face 845 by means of a flange 826 to supply charge gas to the charge gas inlets 822, and a charge gas outlet duct (not shown) is coupled to a face 847 by means of a flange 828 to receive expelled charge gas from the charge gas outlets 824.

Referring to FIG. 10, a top view of the heat exchanger and combustor combination of FIGS. 8 and 9 is schematically illustrated. The top of the heat exchanger body 800 as shown in FIG. 10 includes a flat metal surface 830 extending in one direction from a top portion of the face 847 and the flange 828 to a top portion of the face 845 and the flange 828, and in the other direction from a top portion of the face 841 and flange 844 for engaging an exhaust duct to a top portion of the face 843 and another flange 846 for engaging another exhaust duct.

Referring to FIG. 11, an end elevation of the heat exchanger and combustor combination of FIGS. 8, 9 and 10 is schematically illustrated. The burner block 802 can be seen in the central lower region, corresponding to the bottom portion 812 of the heat exchanger body 800 as described with reference to FIG. 8. The sides of the charge gas conduits 813 are represented in the left and right lower regions of FIG. 11. Above this, in areas corresponding to the main portion 814 and the roof portion 816 shown in FIG. 8, the end face of the heat exchanger body 800 is populated with exhaust outlets. Exhaust emissions from the exhaust outlets are taken away (either permanently, or to be recycled, from the heat exchanger body via exhaust ducts coupled to the end face 841 and the end face 843 of the heat exchanger body 800.

Charge gas conduits 813 are shown extending horizontally across FIG. 11, with the charge gases entering the heat exchanger body 800 at the face 845 and leaving the heat exchanger body 800 from the face 847. Charge ducts, similar to the exhaust ducts coupled to the faces 841 and 843 of the heat exchanger body 800 are coupled to the faces 845 and 847 of the heat exchanger body 800 to supply charge gas to the face 845 of the heat exchanger body 800 and to receive it from the face 847 of the heat exchanger body 800.

In the present case, the face of the heat exchanger 800 which is opposite to the face illustrated in FIG. 11 is identical to the face shown, although in other embodiments of invention it may be different.

FIG. 12 schematically illustrates a horizontal cross section through the roof portion 816 of the heat exchanger body along the line A-A in FIG. 8. The cross section shows exhaust conduits 815 which run from above the burner chamber 804 to the face 841 and the face 843 of the heat exchanger body. Exhaust gases enter the roof portion 816 above the burner chamber 804 via vertical conduits 819, depicted in FIG. 12 by crossed squares. The general path of the exhaust gases from the vertical conduits 819 to the face 841 and the face 843 are depicted by directional arrows within the exhaust gas conduits 815. FIG. 12 also depicts the position of the charge gas conduits 813 in relation to the exhaust gas conduits 815. The charge gas conduits 813 run perpendicular to the exhaust gas conduits 815 in an adjacent layer.

FIG. 13 schematically illustrates a horizontal cross section through the main portion 814 of the heat exchanger body along the line B-B in FIG. 8. The cross section shown in FIG. 13 corresponds to a layer of exhaust gas conduits 815. As with the cross section shown in FIG. 12, the exhaust gas conduits 815 run from the burner chamber 804 to the face 841 and the face 843 of the heat exchanger body within the plane of the cross section shown. The directional arrows leaving the burner chamber 804 illustrate the flow direction of hot exhaust gases within the burner chamber 804.

FIG. 14 schematically illustrates a horizontal cross section through the main portion 814 of the heat exchanger body along the line C-C in FIG. 8. The cross section shown in FIG. 14 corresponds to a layer of charge gas conduits 813. The charge gas conduits 813 run from the face 845 to the opposite face 847, with charge gas entering the charge gas conduits 813 at the face 845 and travelling through the charge gas conduits 813 to exit the heat exchanger body at the face 847. This direction of travel is illustrated for a selection of charge gas conduits 813 by the directional arrows shown entering, traversing and exiting the charge gas conduits 813. The central charge gas conduits 813 circumvent the burner chamber 804 by taking an indirect path from the face 845 to the face 847 of the heat exchanger body.

FIGS. 15A to 15C schematically illustrate the duct arrangements for supplying and receiving charge gas, for supplying a fuel/air mixture, and for receiving exhaust gases. Referring first to FIG. 15A, the bottom of heat exchanger 800 has coupled thereto a fuel/air mixture duct 884 for providing the burner block 802 with the fuel/air mixture for combustion. Two exhaust ducts 886a and 886b are coupled to opposite faces of the heat exchanger 800, and meet up above the heat exchanger 800 to form a single exhaust duct 886c. Exhaust gases collected by the exhaust ducts 886a and 886b follow the path shown by the curved directional arrows. A charge gas inlet duct 880 and a charge gas outlet duct 882 are also coupled to the heat exchanger 800. The relative positions of the charge gas inlet duct 880 and the charge gas outlet duct 882 can be seen more clearly in FIGS. 15B and 15C, in which the charge gas inlet duct 880 and the charge gas outlet duct 882 are shown to be coupled to the remaining two side faces of the heat exchanger 800 which are not coupled to an exhaust duct 886a, 886b.

FIG. 16 schematically illustrates a heat exchanger manufactured by SLR within a water heater. As shown the heat exchanger has a complex form of a tubular matrix structure with cross-linking and conduits disposed one inside another. This complex 3D form allows high efficiency, and is one which would be impractical to make in accordance with previously known non-SLR techniques.

FIG. 17 illustrates a heat exchanger having an inlet manifold 1002 and an outlet manifold 1004 both formed by selective laser remelting. Conduits 1000 consisting of prefabricated fine tubes are joined to the manifolds 1002, 1004, such as by an interference fit, laser remelting of the manifolds fusing them to the tubes as the manifolds are formed, brazing or in some other way. This partial prefabrication allows lower cost prefabricated tubes 1000 to be used for the bulk of the heat exchanger (possibly with concentric tube arrangements) with the complicated and otherwise difficult to form manifolds being made by laser remelting thereby allowing for manifold arrangements that would other be impractical.

Although the above arrangements have been described with reference to both the exhaust gas and charge gas being "gases", in practice one or both of these could be in liquid form and mixed phase embodiment may be particularly suitable for some uses.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims. In particular, the invention also relates to reformers, reactors, combustors and any combination of them, and is particularly relevant where reducing size, weight, and/or use of materials, and improving reaction and/or heat transfer efficiency is important, or where high temperatures and/or pressures apply. Applications extend beyond Stirling engines, for example, to quasi-Stirling cycle machines, Brayton cycle machines, boilers, water or other fluid heaters, fuel cells, vaporizers, cryogenics devices, cooling devices, air conditioners and refrigerators, and devices for use in chemical, pharmaceutical and related processes. In general terms the invention applies to any machine or process which requires heat exchange, reforming, reaction or combustion.

The invention claimed is:

1. A method of making at least a portion of a heat exchanger from a fusible powder, said portion having a plurality of conduits passing therethrough, the method comprising the steps of:
   (1) providing a vertically moveable platen in a fusing chamber, said chamber having an open upper edge;
   (2) positioning the platen a desired layer thickness distance below said upper edge in said fusing chamber forming an active fusing volume;
   (3) filling said volume with said powder forming a powder layer;
   (4) fusing portions of said powder layer by means of at least one energy beam applied to said powder layer in accordance with a predetermined design for said layer;
   (5) moving said platen an additional desired layer thickness below said upper edge forming an additional fusing volume;
   (6) repeating steps (3) through (5) until completion of said at least a portion of said heat exchanger fused out of said powder and having a surface area density of at least 5000 $m^2/m^3$ and a mean porosity of at least 0.6.

2. A method according to claim 1, wherein at least one conduit is an outer conduit and has an inner conduit disposed within it along at least a portion of its length.

3. A method according to claim 2, wherein the inner conduit terminates within the outer conduit.

4. A method according to claim 3, wherein the inner conduit terminates with a closed end.

5. A method according to claim 3, wherein the inner conduit terminates with an open end.

6. A method according to claim 2, wherein the outer conduit and the inner conduit are arranged to receive different fluids.

7. A method according to claim 2, wherein the wall of the inner conduit includes one or more apertures to allow mixing between a fluid in the outer conduit and a fluid in the inner conduit.

8. A method according to claim 2, wherein the wall of the inner conduit is porous to allow mixing between a fluid in the outer conduit and a fluid in the inner conduit.

9. A method according to claim 2, wherein the inner conduit and the outer conduit have a substantially common longitudinal axis.

10. A method according to claim 2, wherein the inner conduit has a longitudinal axis which is offset from a longitudinal axis of the outer conduit.

11. A method according to claim 2, wherein the inner conduit has a further inner conduit disposed within it along at least a portion of its length.

12. A method according to claim 2, wherein the inner conduit passes through a wall of the outer conduit at one or more positions.

13. A method according to claim 1, wherein the heat exchanger comprises a chamber to receive a combustor.

14. A method according to claim 13, wherein the combustor is provided within the chamber and sealed within the heat exchanger.

15. A method according to claim 14, wherein one or more conduits recycle exhaust gases back to the combustor.

16. A method according to claim 13, further comprising the step of manufacturing the combustor by energy beam remelting.

17. A method according to claim 16, wherein the heat exchanger and the combustor are co-formed as a single unit.

18. A method according to claim 13, wherein the heat exchanger is arranged to receive the fuel and combustion air separately, the fuel and combustion air being mixed within the heat exchanger.

19. A method according to claim 18, wherein the mixed fuel and combustion air is combusted at predetermined locations within the heat exchanger.

20. A method according to claim 13, wherein the combustor comprises a combustion controller.

21. A method according to claim 13, wherein the combustor is arranged to receive pre-mixed fuel and combustion air.

22. A method according to claim 1, wherein an interior surface of one or more conduits is provided with one or more protuberances.

23. A method according to claim 22, wherein at least one of the protuberances is a fluid directing formation providing less fluid flow resistance in a forward direction compared with a reverse direction.

24. A method according to claim 22, wherein at least one of the protuberances provides heat transfer into a fluid or an adjacent conduit.

25. A method according to claim 22, wherein at least one of the protuberances provides structural support to the conduit.

26. A method according to claim 22, wherein at least one of the protuberances serves as a stay within the conduit.

27. A method according to claim 22, wherein at least one of the protuberances is shaped to change fluid flow within a conduit from laminar flow to turbulent flow.

28. A method according to claim 1, further comprising the step of varying the porosity of the heat exchanger within a layer and/or between layers.

29. A method according to claim 28, wherein a region of the heat exchanger separating two or more adjacent conduits within the heat exchanger is permeable to a fluid passing through one or more of the adjacent conduits.

30. A method according to claim 1, wherein a first subset of the conduits have a first orientation and a second subset of the conduits have a second orientation, the second orientation being different from the first orientation.

31. A method according to claim 30, wherein a third subset of the conduits have a third orientation, the third orientation being different from both, the first or second orientations.

32. A method according to claim 1, wherein at least a portion of the conduits are curved in a longitudinal direction.

33. A method according to claim 32, wherein the curved conduits weave around other conduits.

34. A method according to claim 1, including the step of coating the inner surfaces of one or more conduits with a material different from the material of the conduit.

35. A method according to claim 34, wherein the coating material is a catalyst.

36. A method as claimed in claim 1, wherein said heat exchanger is made by including the step of forming of a plurality of prefabricated conduit tubes and joining the tubes to a conduit manifold formed by laser remelting.

37. A method as claimed in claim 36, wherein said prefabricated conduit tubes are joined to said conduit manifold by one of an interference fit; laser remelting; welding; brazing; and shrink fitting.

38. A method according to claim 1, wherein said plurality of conduits have a substantially continuous circular or elliptical outer cross-section.

39. A method according to claim 1, further comprising the step of heating each layer to near the fusion point of the powder before the step of enemy beam fusion of portions of the layer.

40. A method according to claim 1, wherein the heat exchanger is formed with a surface area density of at least 8000 $m^2/m^3$ and a mean average porosity of at least 0.7.

41. A method according to claim 1, wherein a group of one or more successive layers of powder can comprise different materials than another group of one or more successive layers of powder.

42. A method according to claim 1, wherein a region of the heat exchanger separating two or more adjacent conduits comprises a thermal insulator.

43. A method according to claim 1, wherein one or more of the conduits has a cross sectional area or shape which varies over the length of the conduit.

44. A method according to claim 1, wherein an exterior surface of one or more conduits is provided with one or more protuberances.

45. A method according to claim 1, wherein a regenerator and/or a cooler is co-formed with the heat exchanger.

46. A method according to claim 1, wherein one or more conduits are operable to provide steam into the heat exchanger.

47. A method as claimed in claim 1, wherein the energy beam fusing step is a laser remelting step.

48. A method as claimed in claim 1, wherein the energy beam fusing step is an electron beam remelting step.

* * * * *